US012586270B2

(12) United States Patent
Qu et al.

(10) Patent No.: US 12,586,270 B2
(45) Date of Patent: Mar. 24, 2026

(54) GENERATING AND MODIFYING DIGITAL IMAGES USING A JOINT FEATURE STYLE LATENT SPACE OF A GENERATIVE NEURAL NETWORK

(71) Applicant: Adobe Inc., San Jose, CA (US)

(72) Inventors: Hui Qu, Santa Clara, CA (US); Baldo Faieta, San Francisco, CA (US); Cameron Smith, Santa Cruz, CA (US); Elya Shechtman, Seattle, WA (US); Jingwan Lu, Santa Clara, CA (US); Ratheesh Kalarot, San Jose, CA (US); Richard Zhang, San Francisco, CA (US); Saeid Motiian, San Francisco, CA (US); Shabnam Ghadar, Menlo Park, CA (US); Wei-An Lin, San Jose, CA (US)

(73) Assignee: Adobe Inc., San Jose, CA (US)

( * ) Notice: Subject to any disclaimer, the term of this patent is extended or adjusted under 35 U.S.C. 154(b) by 361 days.

(21) Appl. No.: 17/655,739

(22) Filed: Mar. 21, 2022

(65) Prior Publication Data

US 2023/0316606 A1     Oct. 5, 2023

(51) Int. Cl.
*G06T 11/60*          (2026.01)
*G06N 3/045*          (2023.01)
(Continued)

(52) U.S. Cl.
CPC .............. *G06T 11/60* (2013.01); *G06N 3/045* (2023.01); *G06N 3/0464* (2023.01);
(Continued)

(58) Field of Classification Search
CPC ........ G06T 11/60; G06N 3/045; G06N 3/092; G06N 3/0464; G06N 3/0475; G06N 3/084
See application file for complete search history.

(56) References Cited

U.S. PATENT DOCUMENTS

2018/0268548 A1 *   9/2018   Lin ......................... G06N 3/084
2020/0357196 A1 *  11/2020   Zhang ................... G06F 18/253
(Continued)

OTHER PUBLICATIONS

K. Liu, et al., "Towards Disentangling Latent Space for Unsupervised Semantic Face Editing", IEEE Transactions on Image Processing, vol. 31, 2022, Jan. 28, 2022, pp. 1475-1489 (Year: 2022).*
(Continued)

*Primary Examiner* — Jin Cheng Wang
(74) *Attorney, Agent, or Firm* — Keller Preece PLLC

(57)                ABSTRACT
The present disclosure relates to systems, non-transitory computer-readable media, and methods for latent-based editing of digital images using a generative neural network. In particular, in one or more embodiments, the disclosed systems perform latent-based editing of a digital image by mapping a feature tensor and a set of style vectors for the digital image into a joint feature style space. In one or more implementations, the disclosed systems apply a joint feature style perturbation and/or modification vectors within the joint feature style space to determine modified style vectors and a modified feature tensor. Moreover, in one or more embodiments the disclosed systems generate a modified digital image utilizing a generative neural network from the modified style vectors and the modified feature tensor.

20 Claims, 16 Drawing Sheets

(51) Int. Cl.

| | |
|---|---|
| *G06N 3/0464* | (2023.01) |
| *G06N 3/0475* | (2023.01) |
| *G06N 3/084* | (2023.01) |
| *G06N 3/092* | (2023.01) |

(52) U.S. Cl.
CPC .......... *G06N 3/0475* (2023.01); *G06N 3/084* (2013.01); *G06N 3/092* (2023.01)

(56) References Cited

U.S. PATENT DOCUMENTS

| | | | | |
|---|---|---|---|---|
| 2022/0277431 | A1* | 9/2022 | Tensmeyer | G06V 10/778 |
| 2022/0375024 | A1* | 11/2022 | Luo | G06T 3/0012 |
| 2023/0040256 | A1* | 2/2023 | Wu | G06T 3/0006 |
| 2023/0065862 | A1* | 3/2023 | Karabutov | G06V 10/761 |
| 2023/0080639 | A1* | 3/2023 | Zoss | G06T 17/20 |
| | | | | 382/100 |

OTHER PUBLICATIONS

Rene Haas, et al., "Tensor-based Subspace Factorization for StyleGAN", 2021 16th IEEE International Conf. on Automatic Face and Gesture Recognition (FG 2021), Dec. 15-18, 2021, pp. 1-8 (Year: 2021).*

Omer Tov, Yuval Alaluf, Yotam Nitzan, Or Patashnik, and Daniel Cohen-Or. Designing an encoder for stylegan image manipulation. arXiv preprint arXiv:2102.02766, 2021.

Yuval Alaluf, Or Patashnik, and Daniel Cohen-Or. Restyle: A residual-based stylegan encoder via iterative refinement. arXiv preprint arXiv:2104.02699, 2021.

Peihao Zhu, Rameen Abdal, John Femiani, and Peter Wonka. Barbershop: GAN-based Image Compositing using Segmentation Masks. arXiv preprint arXiv:2106.01505, 2021.

Daniel Roich, Ron Mokady, Amit H. Bermano, and Daniel Cohen-Or. Pivotal Tuning for Latent- based Editing of Real Images. arXiv preprint arXiv:2106.05744, 2021.

* cited by examiner

Computing Device(s) *1400*

Digital Graphics System *104*

Image Projection System *106*

Digital Image Manager *1406*

Generative Neural Network Manager *1408*

Digital Image Modification Manager *1410*

Data Storage Manager *1412*

1500

Generating A Feature Tensor With A Generative Neural Network
_1502_

Mapping Style Vectors And The Feature Tensor To A Joint
Feature Style Space _1504_

Applying A Perturbation Within The Joint Feature Style Space
_1506_

Generating A Modified Digital Image With The Generative Neural
Network _1508_

GENERATING AND MODIFYING DIGITAL IMAGES USING A JOINT FEATURE STYLE LATENT SPACE OF A GENERATIVE NEURAL NETWORK

BACKGROUND

In recent years, conventional image generating systems have increasingly implemented neural networks to perform computer image tasks. For instance, many conventional systems use generative neural networks, such as generative adversarial networks (GANs) to generate or modify digital images. In one such approach, conventional image generating systems project real data points of an image onto a latent vector that is subsequently utilized by a GAN to reconstruct or modify the image. Some such conventional systems are able to produce realistic modified images by implementing edits in latent space using pre-learned latent modification vectors. Despite recent advancements in editing digital images within latent spaces, however, conventional methods require large amounts of time, have high computational costs, and can introduce unwanted visual artifacts within the generated images. Accordingly, many conventional image generating systems that utilize neural networks to modify digital images have a number of shortcomings with regard to accuracy, efficiency, and flexibility.

For instance, conventional methods include latent-based editing, which changes the latent code of a digital image and generates a modified image from the edited latent code. In particular, some conventional methods use pre-learned directions, or sliders, within latent spaces for editing either by supervised facial attribute labels or unsupervised methods such as principal component analysis or eigenvector decomposition. For example, many conventional methods utilize an intermediate latent space such as the W space or the extended W+ space to edit latent code in a manner that is highly editable but often results in unrealistic distortion or artifacts within the modified image. Some methods additionally use a more disentangled space known as Style space to find supplementary sliders that produce less distortion but offer less editability/flexibility. Accordingly, tradeoffs in editability and distortion are common shortcomings in conventional latent-based editing methods.

Further, conventional methods for preserving details in latent-based editing of images are often time-consuming or ineffective, and often consume an inefficient amount of computational resources to optimize the generated digital image. To mitigate the tradeoff between editability and distortion, for instance, some conventional image generating systems utilize alternative methods for preserving image details whilst maintaining editability, such as pivotal tuning or use of alternative latent spaces. Although such conventional systems keep editability whilst reducing distortion, they oftentimes do so with a significant expense of time and computational resources. Accordingly, conventional image generating systems often fail to maintain the accuracy of modified images (e.g., produce high quality and high-fidelity versions of the modified input images) while improving processing speed and resource costs.

These along with additional problems and issues exist with regard to conventional image-generating methods and systems utilizing generative neural networks.

BRIEF SUMMARY

Embodiments of the present disclosure solve one or more of the foregoing or other problems in the art with systems, non-transitory computer-readable media, and methods for latent-based editing of digital images using a generative neural network. For example, the disclosed systems and methods implement a new joint feature style (JFS) latent space for improved latent-based editing of digital images. For instance, the disclosed systems and methods utilize JFS latent space to improve processing times (e.g., relative to pivotal tuning and FS latent space approaches), reduce utilization of computation assets, and increase fidelity of modified digital images.

To illustrate, in some embodiments, the disclosed systems utilize a generative neural network to generate a feature tensor for a digital image from a first subset of style vectors, then map a second subset of the style vectors and the generated feature tensor to a joint feature style latent space. Within the joint feature style space, the disclosed systems determine and apply a joint feature style perturbation to modify the mapped style vectors and feature tensor. The disclosed systems may also implement modification vectors within the joint feature style space to apply various stylistic effects, such as age modifications, facial expression changes, or object orientation adjustments. Accordingly, the disclosed systems generate a modified digital image from the modified style vectors and modified feature tensor from the joint feature style space using a generative neural network. By utilizing the joint feature style space to apply a joint feature style perturbation and any desired edits to the latent code of a given image, the disclosed systems improve accuracy while reducing the time and resources needed to generate a modified digital image and improving flexibility to provide real-time or near real-time editing of digital images. Furthermore, in one or more embodiments the disclosed systems reduce disk memory usage compared to conventional methods by an order of magnitude or more (e.g., from about 118 MB to about 2 MB).

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
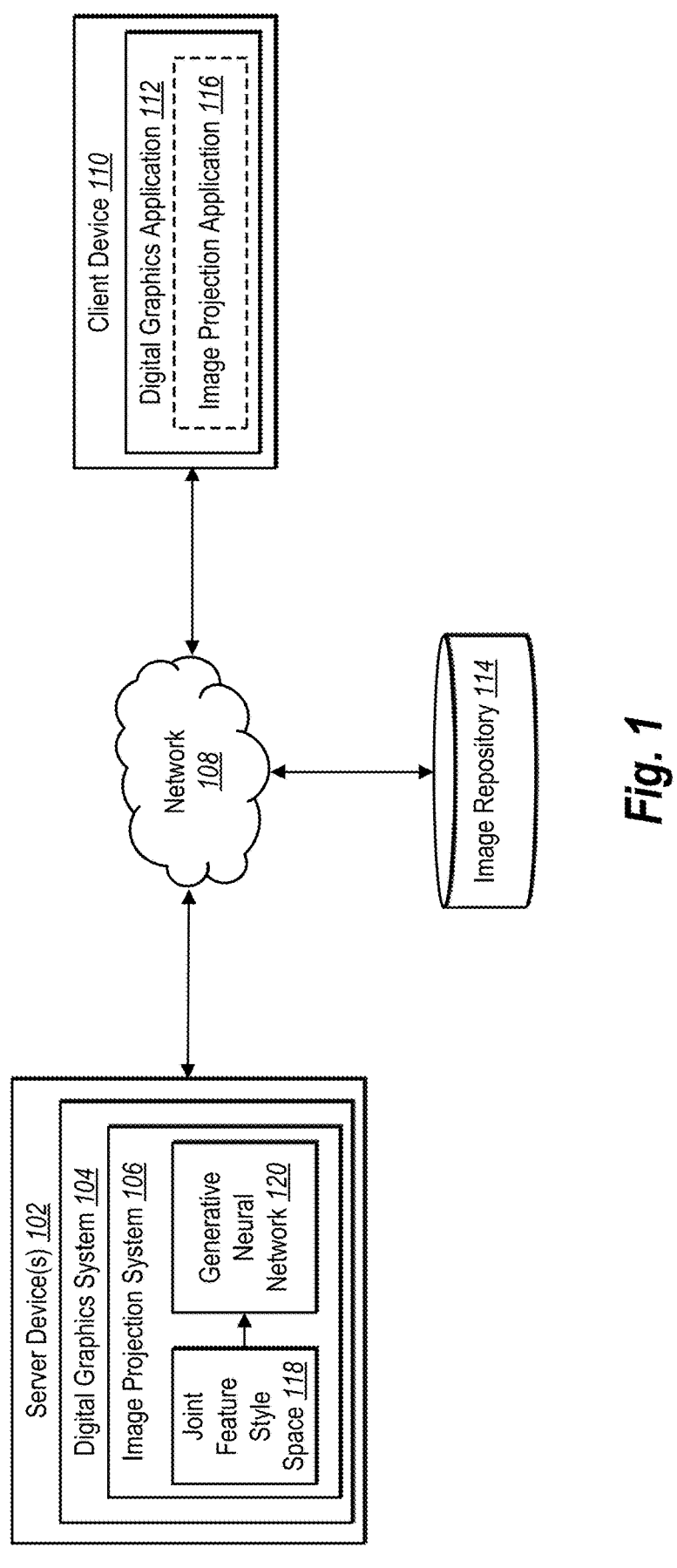
FIG. 1 illustrates a diagram of an environment in which an image projection system operates in accordance with one or more embodiments.

This disclosure describes one or more embodiments of an image projection system that utilizes a generative neural network to generate digital images and implement style modifications in a new joint feature style (JFS) latent space to preserve digital image details. For example, the image projection system improves latent-based editing in a flexible manner that incorporates latent-space editing directions or sliders from other latent spaces and integrates with pre-trained generative neural network architectures. For instance, the image projection system edits the latent code of a digital image by projecting one or more latent slider edits to the new joint feature style latent space and applies a joint feature style perturbation within the new space to reduce reconstruction error and improve the fidelity of the modified digital image.

To further illustrate, in one or more embodiments, the image projection system generates intermediate latent vectors from the digital image (utilizing a series of convolutional layers), generates style vectors from the intermediate latent vectors (utilizing learned transformation layers), and generates a feature tensor from the style vectors (utilizing generative convolutional blocks). The image projection system can manipulate one or more of these vectors within a new joint feature style space to generate more realistic digital images and improve flexibility in editing style features of the digital image.

Specifically, in one or more embodiments, the image projection system maps style vectors together with a feature tensor to a joint feature style space. Within the joint feature style space, the image projection system applies a joint feature style perturbation to determine modified style vectors and a modified feature tensor. The image projection system utilizes the modified style vectors and the modified feature tensor with the generative neural network to produce a modified digital image.

As just mentioned, in one or more embodiments the image projection system preserves image details within the joint feature style space by utilizing a joint feature style perturbation. In particular, the image projection system determines a joint feature style perturbation to reduce (e.g., minimize) reconstruction error. For example, in one or more embodiments the image projection system calculates the joint feature style perturbation using an optimization model (e.g., that iteratively modifies a perturbation within the joint feature style space to reduce reconstruction error). In some embodiments, the image projection system trains and utilizes a neural network encoder to determine the joint feature style perturbation from input digital images.

Furthermore, in one or more implementations, the image projection system edits digital images (e.g., based on user interaction with one or more feature sliders). For instance, the image projection system transfers one or more slider edits into the joint feature style space from other latent spaces in response to a user request to modify a target digital image. For example, the image projection system translates slider edits in the form of image modification vectors from an intermediate latent space and/or a style space to the joint feature style space. For instance, the image projection system applies the image modification vectors together with a joint feature style perturbation to a joint feature style vector within the joint feature style space to generate modified style vectors and a modified feature tensor that reflects stylistic edits. By applying a joint feature style perturbation in addition to the image modification vectors, the resultant modified image includes accurate edits as well as a high fidelity to the details of the original digital image.

To further preserve details and prevent unintentional alterations to the generated image, some embodiments of the image projection system also utilize a locality regularization term. For example, in one or more embodiments the image projection system implements locality regularization to restrict changes to a local region within a particular latent space. For instance, in some embodiments, the image projection system utilizes a locality regularization term in determining the joint feature style perturbation to avoid artifacts and maintain editability.

In one or more implementations, the disclosed image projection system provides a variety of advantages and benefits over conventional systems and methods. For example, by optimizing latent code within the new joint feature style space, in one or more implementations the image projection system improves the accuracy and fidelity of modified digital images relative to conventional systems (e.g., relative to direct editing methods in W or W+ style spaces). Specifically, the disclosed image projection system significantly reduces the introduction of artifacts in generated images compared to conventional systems while preserving the ability to edit digital images.

Also, by transferring image modification sliders from other latent spaces into the joint feature style space, in one or more embodiments the image projection system flexibly applies to a variety of generative neural network architectures. Indeed, in one or more embodiments, the image projection system transfers sliders and image modification vectors from other latent spaces to the joint feature style space in generating modified digital images. Accordingly, in some embodiments, the image projection system operates in conjunction with pre-trained generative adversarial networks (GANs) that utilize other latent spaces in generating high-fidelity images.

In addition to improved accuracy, flexibility, fidelity, and editability of digital images, in some implementations the image projection system also exhibits increased efficiency relative to conventional systems. Indeed, relative to pivotal tuning and/or FS space approaches, the image projection improves speed and reduces computational overhead. Moreover, relative to other approaches (such as direct editing in W, W+, or style spaces) the image projection maintains editability and speed while providing improved fidelity. Moreover, many conventional system apply an optimization procedure within an intermediate latent space to fine-tune the generator with constraints, which can take approximately two minutes to perform. By performing optimization techniques with the new joint feature style space, in one or more embodiments, in one or more implementations the image projection system significantly reduces processing time and computing resources (e.g., memory and processing power). Indeed, researchers have documented these improvements through experimental results, as described in greater detail below.

As illustrated by the foregoing discussion, the present disclosure utilizes a variety of terms to describe features and advantages of the image projection system. Additional detail is now provided regarding the meaning of such terms. For example, as used herein, the term "digital image" (sometimes referred to as "image") refers to a digital symbol, picture icon, and/or other visual illustration depicting one or more objects. For instance, an image includes a digital file having a visual illustration and/or depiction of a person or a face (e.g., a portrait image). In some embodiments, an image includes, but is not limited to, a digital file with the following extensions: JPEG, TIFF, BMP, PNG, RAW, or PDF. In addition, in certain instances, an image includes a digital frame of a digital video. In particular, in one or more embodiments, an image includes a digital frame within, but not limited to, a digital file with the following extensions: MP4, MOV, WMV, AVI, or AVI.

Furthermore, as used herein, the term "neural network" refers to a machine learning model that can be trained and/or tuned based on inputs to approximate unknown functions. For example, a neural network includes a model of interconnected artificial neurons (e.g., organized in layers) that communicate and learn to approximate complex functions and generate outputs (e.g., generated digital images) based on a plurality of inputs provided to the neural network. In some cases, a neural network refers to an algorithm (or set of algorithms) that implements deep learning techniques to model high-level abstractions in data.

Relatedly, the term "generative neural network" refers to a neural network that generates digital content. In some cases, the generative neural network includes a neural network that generates digital images from one or more input features (e.g., an input digital image or noise). For example, a generative neural network includes a neural network that reconstructs target digital images from learned latent vectors. In one or more of the disclosed embodiments, the generative neural network or image-generating neural network includes a generative adversarial neural network (GAN), such as StyleGAN as described by R. Abdal et al. in *A Style-Based StyleFlow: Attribute-conditioned Exploration of StyleGAN-Generated Images using Conditional Continuous Normalizing Flows*, arXiv: 2008.02401, (2020), the content of which is hereby incorporated by reference in its entirety (hereinafter Abdal). Another example of a GAN includes a StyleGAN2 as described by T. Karras et al. in *A Style-Based Generator Architecture for Generative Adversarial Networks*, In Proceedings of the IEEE Conference on Computer Vision and Pattern Recognition, pages 4401-4410, 2019, the content of which is hereby incorporated by reference in its entirety (hereinafter Karras).

Moreover, as used herein, the term "latent vector" refers to a digital data embedding of latent (or hidden) features of a neural network. For example, a latent vector includes a vector reflecting features of a digital image that are indecipherable (to a human) but, when processed by layers of a generative neural network, generate a digital image. Relatedly, the term "latent space" refers to a multi-dimensional space containing latent values (e.g., latent vectors) that cannot be interpreted directly but which encode a meaningful internal representation of externally observable features (e.g. features of a digital image).

Further, latent vectors and latent spaces at varying levels of abstraction are discussed herein. For instance, as used herein, the term "intermediate latent vector" refers to a latent vector generated from a digital image (and from which style vectors are generated). For example, in some embodiments, the image projection system generates intermediate latent vectors from a digital image utilizing one or more convolutional layers of a neural network. In some instances, the intermediate latent vector includes one or more latent feature vectors w from the W latent space and/or extended $W^+$ latent space as described by Image2StyleGAN and/or Image2StyleGAN++. Similarly, an intermediate latent space refers to a multi-dimensional feature space corresponding to one or more intermediate latent vectors. For instance, an intermediate latent space can include the W latent space and/or extended $W^+$ latent space.

Also, as used herein, "style vector" refers to a latent vector representing styles of a digital image. In particular, a style vector includes a latent vector representation generated from intermediate latent vectors. Accordingly, as used herein, the term "style space" refers to the latent space in which style vectors are embedded. To illustrate, some embodiments of the image projection system generate style vectors from a set of intermediate latent vectors by applying learned transformations within a neural network (e.g., learned affine transformations). In some instances, style vectors are generated by applying learned affine transformation to one or more latent feature vectors w, as described in Karras.

Further still, as used herein, the term "feature tensor" refers to a digital representation of one or more features of a digital image. For example, a feature tensor can include a vector or matrix representation of features for generating a modified digital image. To illustrate, a feature tensor can include an n-dimensional matrix generated by passing a set of style vectors through a series of generative convolutional blocks of a generative neural network.

Relatedly, as used herein, the term "generative convolutional block" refers to a convolutional layer of a generative neural network. For example, in some embodiments, a generative convolutional block includes one or more convolutional layers and one or more adaptive instance normalization layers. To illustrate, a generative neural network can construct a digital image from a set of style vectors by processing the style vectors through a series of generative convolutional blocks, as described in Abdal and Karras.

Relatedly, as used herein, the term "joint feature style vector" refers to a vector that includes a combination of a feature tensor and a style vector. Accordingly, the term "joint feature style space" refers to a multi-dimensional latent space corresponding to one or more joint feature style vectors. In particular, a joint feature style vector can include a combination of a feature tensor and a subset of style vectors. To illustrate, a joint feature style vector can include a vector reflecting a combination of a feature tensor generated from a first subset of style vectors combined with a second subset of style vectors.

Moreover, as used herein, the term "joint feature style perturbation" refers to a deviation or adjustment applied to one or more joint feature style vectors. More specifically, within a joint feature style space, a joint feature style perturbation can be applied to or combined with one or more joint feature style vectors corresponding to an input digital image to reduce a reconstruction error between the input digital image and a digital image reconstructed from the one or more joint feature style vectors using a generative neural network.

Also, as used herein, the term "reconstruction error" refers to a value representing a value or an amount of error determined between a modified (or reconstructed) version of a digital image (from a generative neural network) compared to the original digital image. More specifically, in one or more embodiments, a reconstruction error includes a value that indicates the accuracy of a modified (or reconstructed) version of a digital image from a generative neural network. In some instances, a reconstruction error includes, but is not limited to, a mean square loss (MSE), a perceptual loss, a quadratic loss, an L1, an L2 loss, and/or learned perceptual image patch similarities (LPIPS) loss.

Moreover, as used herein, the term "locality regularization term" refers to a measure of loss applied to restrict changes to a local region within a latent space. More specifically, a locality regularization term can be implemented within a latent space to reduce the effects of modifications introduced by the image projection system, such as the joint feature style perturbation or image modifications requested by a user.

Additionally, as used herein, the term "gradient descent optimization model" refers to an iterative optimization algorithm for finding a local minimum of a differentiable function. To illustrate, an image projection system can use a gradient descent optimization model to iteratively calculate a joint feature style space perturbation to reduce a reconstruction loss between an input digital image and a reconstructed digital image. For example, in one or more embodiments, the image projection system uses an Adam optimization algorithm to optimize one or more objective functions, which is a stochastic gradient descent method adapted for training deep neural networks.

Also, as used herein, the term "neural network encoder" refers to a type of neural network used to learn efficient encodings of data. For instance, a neural network encoder learns a representation for a set of data by supplying the encoder with a batch of input data set (e.g., a batch of digital images) and training the encoder to identify details significant to a target output. In some embodiments, the image projection system uses a neural network encoder that is trained to estimate joint feature style space perturbations for digital images.

Turning now to the figures, FIG. 1 illustrates a schematic diagram of one embodiment of a system 100 (or environment) in which an image projection system 106 operates in accordance with one or more embodiments. As illustrated, the system 100 includes server device(s) 102, a network 108, a client device 110, and an image repository 114. As further illustrated, the server device(s) 102, the client device 110, and the image repository 114 communicate with one another via the network 108.

As shown in FIG. 1, the server device(s) 102 include a digital graphics system 104 that further includes the image projection system 106. For instance, the server device(s) 102 includes, but is not limited to, a computing device (such as explained below in reference to FIG. 16). In some embodiments, the image projection system 106 generates an initial latent encoding of a target digital image and maps the initial encoding into a joint feature style space 118. Within the joint feature style space 118, the image projection system 106 generates modified latent vectors by applying a joint feature style perturbation. In some instances, image projection system 106 receives a request to modify the target digital image from the client device 110 and, in response, applies one or more modifications from within the joint feature style space 118. Subsequently, the image projection system 106 utilizes a generative neural network 120 to generate a modified (or reconstructed) digital image (as further described below).

Furthermore, as shown in FIG. 1, the system 100 includes the client device 110. In some embodiments, the client device 110 includes, but is not limited to, a mobile device (e.g., smartphone, tablet), a laptop, a desktop, or any other type of computing device, including those explained below in reference to FIG. 16. Although not shown in FIG. 1, some embodiments of client device 110 are operated by a user to perform a variety of functions via a digital graphics application 112. For example, the client device 110 (through the digital graphics application 112) performs functions such as, but not limited to, sending digital images and/or sending requests to modify digital images to the image projection system 106. In addition, in some embodiments, the client device 110 also receives modified versions of digital images from the image projection system 106.

To access the functionalities of the image projection system 106 (as described above and in greater detail below), in one or more embodiments, a user interacts with the digital graphics application 112 on the client device 110. For example, the digital graphics application 112 includes one or more software applications (e.g., to interact with and/or modify images in accordance with one or more embodiments herein) installed on the client device 110. In certain instances, the digital graphics application 112 is hosted on the server device(s) 102. Additionally, when hosted on the server device(s) 102, the digital graphics application 112 is accessed by the client device 110 through a web browser and/or another online interfacing platform and/or tool.

Although FIG. 1 illustrates the image projection system 106 being implemented by a particular component and/or device within the system 100 (e.g., the server device(s) 102), in some embodiments the image projection system 106 is implemented, in whole or part, by other computing devices and/or components in the system 100. For instance, in some embodiments, the image projection system 106 is implemented on the client device 110 within an image projection application 116. More specifically, in one or more embodiments, the description of (and acts performed by) the image projection system 106 are implemented (or performed by) the image projection application 116 when the client device 110 implements the image projection system 106. In particular, in some embodiments, the client device 110 (via an implementation of the image projection system 106 on the image projection application 116) generates an initial encoding of a target digital image within the joint feature style space 118 and applies a joint feature style perturbation and/or user-requested modification therein before generating a modified digital image using the generative neural network 120.

In some embodiments, the server device(s) 102 trains one or more machine-learning models described herein. The image projection system 106 on the server device(s) 102 provides the one or more trained machine-learning models to the image projection application 116 on the client device 110 for implementation. In other words, the client device 110 obtains (e.g., downloads) the machine-learning models from the server device(s) 102. At this point, the client device 110 may utilize the machine-learning models to generate modified digital images.

In some embodiments, the image projection application 116 includes a web hosting application that allows the client device 110 to interact with content and services hosted on the server device(s) 102. To illustrate, in one or more implementations, the client device 110 accesses a web page or computing application supported by the server device(s) 102. The client device 110 provides input to the server device(s) 102 (e.g., a digital image). In response, the image projection system 106 on the server device(s) 102 performs operations described herein to generate a modified digital image. The server device(s) 102 then provides the output or results of the operations (e.g., a modified digital image) to the client device 110.

As further shown in FIG. 1, the system 100 includes the image repository 114. In one or more embodiments, the image repository 114 includes, but is not limited to, a server device, a cloud service computing device, or any other type of computing device (including those explained below with reference to FIG. 16) that stores one or more digital images. In some embodiments, the image projection system 106 accesses the image repository 114 to retrieve one or more digital images. For example, the image projection system 106 utilizes images from the image repository 114 to apply modifications within the joint feature style space 118 and generate a modified digital image using the generative neural network 120. In some instances, the image projection system 106 performs the above-mentioned tasks upon receiving a request from the client device 110 to utilize digital images from the image repository 114.

Additionally, as shown in FIG. 1, the system 100 includes the network 108. As mentioned above, in some instances, the network 108 enables communication between components of the system 100. In certain embodiments, the network 108 includes a suitable network and may communicate using any communication platforms and technologies suitable for transporting data and/or communication signals, examples of which are described with reference to FIG. 16. Furthermore, although FIG. 1 illustrates the server device(s) 102, the client devices 110, and the image repository 114 communicating via the network 108, in certain embodiments, the various components of the system 100 communicate and/or interact via other methods (e.g., the server device(s) 102 and the client device 110 communicating directly).

As previously mentioned, in one or more embodiments, the image projection system 106 projects a target digital image into a joint feature style vector in a joint feature style space, modifies the joint feature style vector, and generates a modified digital image utilizing the generative neural network. For instance, FIG. 2 illustrates the image projection system 106 generating a modified digital image 220 in accordance with one or more embodiments.

Figure 2:
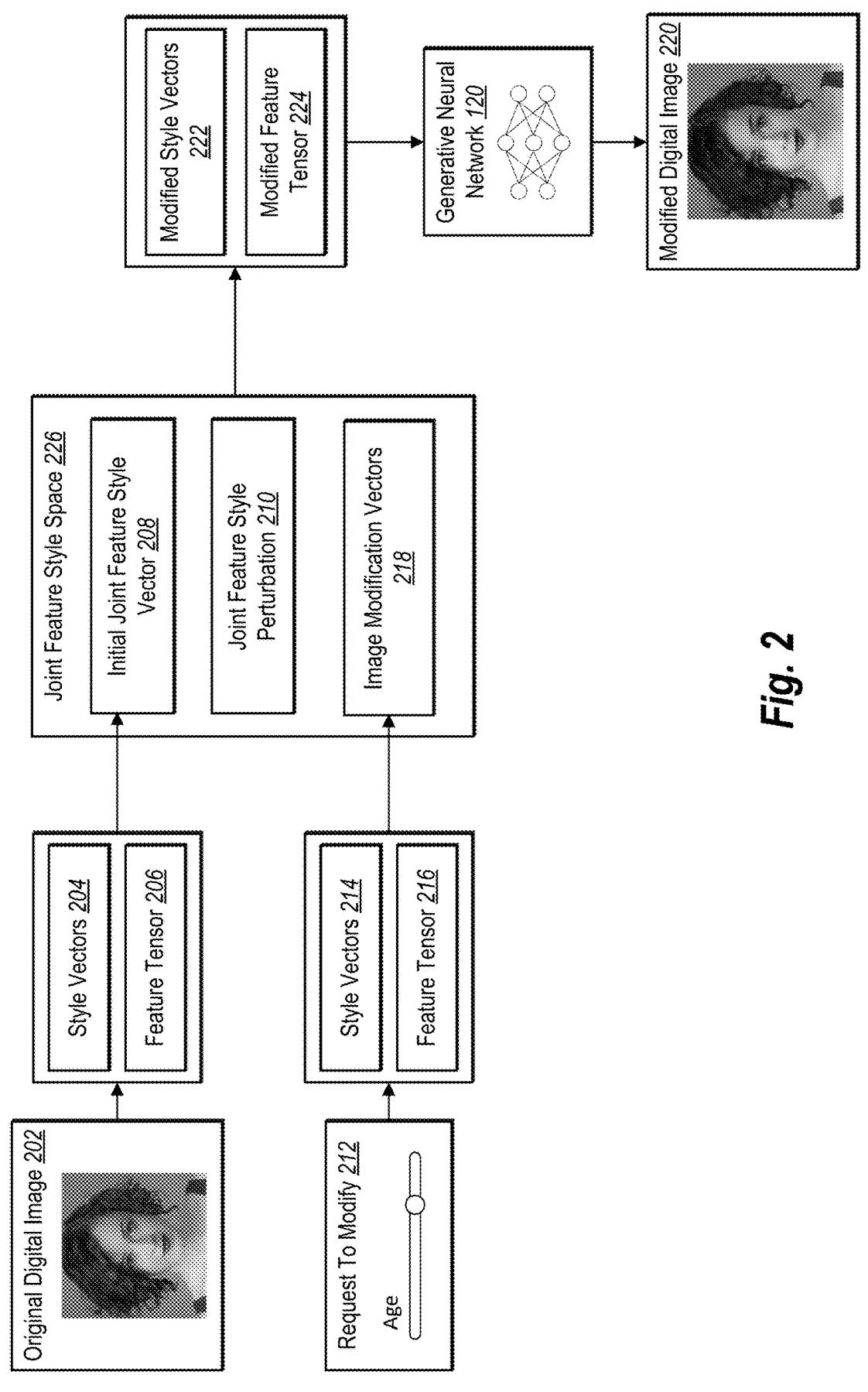
FIG. 2 illustrates an overview of an image projection system producing a modified digital image utilizing a joint feature style space in accordance with one or more embodiments.

Specifically, FIG. 2 illustrates the image projection system 106 projecting an original digital image 202 into a joint feature style space 226. In particular, the image projection system 106 combines one or more style vectors 204 and a feature tensor 206 to generate an initial joint feature style vector 208 within the joint feature style space 226. As further described below, the image projection system 106 derives the feature tensor 206 from a subset of the style vectors 204 utilizing generative convolutional blocks of a generative neural network.

As further illustrated in FIG. 2, the image projection system 106 applies a JFS perturbation 210 to the initial joint feature style vector 208 within the joint feature style space 226. By applying the JFS perturbation 210, the image projection system 106 determines modified style vectors 222 and a modified feature tensor 224. As shown, the image projection system 106 generates the modified digital image 220 from the modified style vectors 222 and the modified feature tensor 224 using the generative neural network 120.

Further, as shown in FIG. 2, the image projection system 106 receives a request to modify 212 the original digital image 202. As illustrated, upon receiving the request to modify 212, the image projection system 106 maps the modification to the joint feature style space 226. In particular, the image projection system 106 determines one or more style vectors 214 and a feature tensor 216 corresponding to the requested modification and maps the one or more style vectors 214 and the feature tensor 216 into the joint feature style space 226 as image modification vectors 218. Within the joint feature style space 226, the image projection system 106 combines the image modification vectors 218 with the initial joint feature style vector 208. Moreover, the image projection system 106 applies the joint feature style perturbation 210. As shown, utilizing this approach the image projection system 106 generates the modified style vectors 222 and the modified feature tensor 224. The image projection system 106 utilizes the modified style vectors 222 and the modified feature tensor 224 to generate the modified digital image 220 utilizing the generative neural network 120.

By utilizing the joint feature style space 226 to incorporate latent edits, the image projection system 106 efficiently produces high-fidelity images while preserving the ability to modify the original digital image 202. For example, in some implementations, the image projection system 106 projects an input digital image in less than 4 seconds and generates a modified digital image in less than 0.5 seconds, thus enabling live editing of digital images. Further, while some conventional systems for latent editing of images require over 100 MB of disk memory per digital image, some implementations of the image projection system 106 require approximately 2.024 MB per digital image.

To further illustrate, the generative network can include, but is not limited to, a generative adversarial neural network (GAN) that is trained on a dataset of facial images to generate facial images from latent vectors. In some embodiments, the image projection system 106 utilizes a generative neural network based on a variety of neural network models such as, but not limited to, an unconditional GAN, a Deep Convolutional GAN (DCGAN), and/or a conditional GAN (cGAN). In addition to or as an alternative to a GAN, in some embodiments, the image projection system 106 can utilize recurrent neural networks (RNN) and/or convolutional neural networks (CNN) to generate digital images from latent vectors.

Figure 3:
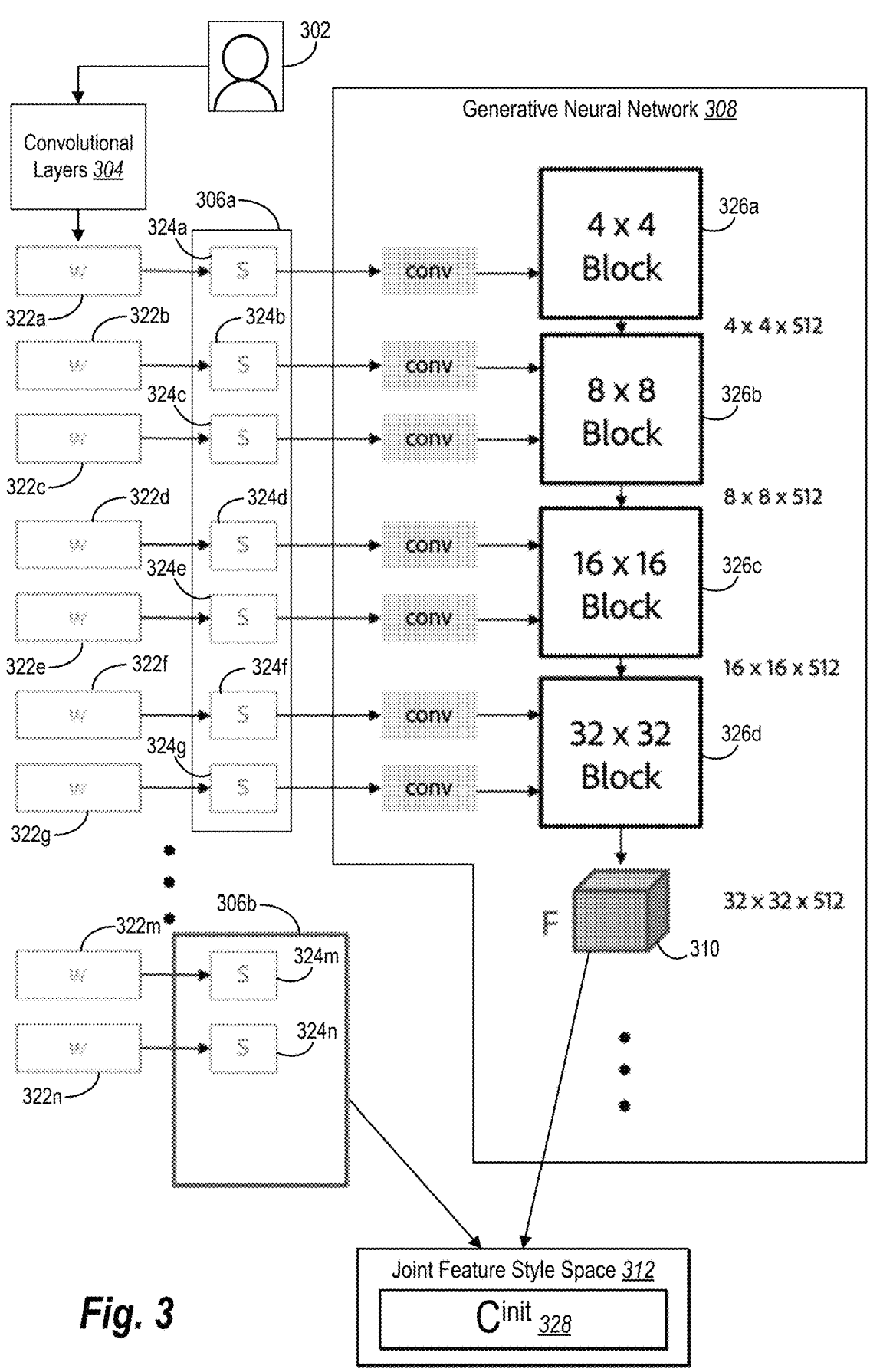
FIG. 3 illustrates inversion of a digital image into a joint feature style space in accordance with one or more embodiments.

As mentioned above, in one or more embodiments the image projection system 106 embeds style vectors and a feature tensor corresponding to a digital image into a joint feature style space to apply modifications to the resultant latent code in generating a modified digital image. For example, FIG. 3 illustrates the image projections system projecting a digital image 302 into an intermediate latent space. In certain instances, the image projection system 106 utilizes convolutional layers 304 (e.g., multiple fully connected convolutional layers) to convert the digital image 302 into intermediate latent vectors $322a$-$322n$ (e.g., w vectors in a W or W+ space). In turn, the image projection system 106 converts the intermediate latent vectors into latent style vectors $324a$-$324n$ (designated s) utilizing a series of learned transformations.

For example, in some embodiments, an intermediate latent vector refers to a set of values representing characteristics and/or attributes (i.e., features) of digital images. In some embodiments, an intermediate latent vector includes data representing characteristics (or features) of pixels of a digital image (e.g., hidden activation values). In such implementations, while these feature values (of the latent feature vector) are not recognizable to a user, they nonetheless characterize the facial and/or other object features of a digital image. Indeed, in certain instances, the latent values of a latent feature vector include latent or custom features that a generative neural network is trained to identify features, such as, but not limited to, object height, width, shape, color, object features (e.g., eyes, nose, mouth, hair), or pixel intensities. Furthermore, in some embodiments, a style vector refers to a set of values representing broader (i.e., stylistic) characteristics of digital images.

As shown in FIG. 3, the image projections system converts a first subset 306a of the style vectors 324a-324n into a feature tensor 310 utilizing a series of convolution blocks 326a-326d of a generative neural network 308. In particular, as shown, the image projection system 106 utilizes a first generative convolutional block 326a to process the first style vector 324a. The first generative convolutional block 326a generates a first feature tensor and passes the first feature tensor to the second generative convolutional block 326b. The second generative convolutional block 326b processes the first feature tensor, the second style vector 324b, and the third style vector 324c to generate a second feature tensor. The second generative convolutional block 326b generates a second feature tensor. As illustrated, the image projection system 106 utilizes the generative convolutional blocks 326a-326d to generate a series of feature tensors from the first subset 306a of the style vectors 324a-324n.

As mentioned above, in one or more embodiments, the image projection system 106 utilizes one or more feature tensors and one or more style vectors to generate a joint feature style vector. For instance, as shown in FIG. 3, the image projection system 106 utilizes feature tensor 310, the output tensor of the fourth convolutional block of a generative adversarial neural network (GAN). As mentioned above, in one or more embodiments, the generative adversarial neural network is trained on a dataset of facial images to generate facial images from latent vectors. For instance, in one or more embodiments the GAN includes a pre-trained StyleGAN image generator.

As further illustrated, in FIG. 3, the image projection system 106 identifies a second subset 306b of the style vectors 324a-324n. In particular, the second subset 306b of the style vectors 324a-324n include one or more style vectors that were not utilized in generating the feature tensor 310 (e.g., style vectors not processed by the generative convolutional blocks 326-326d). The image projection system 106 combines (e.g., concatenates or adds) the second subset 306b of the style vectors with the feature tensor 310 to produce a joint feature style vector 328 (designated $C^{init}$) in a joint feature style space 312. Accordingly, the joint feature style vector 328 (i.e., $C^{init}$) includes an initial feature tensor $F^{init}$ (i.e., the feature tensor 320) and initial set of style vectors $S2^{init}$ (i.e., the subset 306b).

Thus, in at least one embodiment, the feature tensor includes the output tensor of the fourth convolutional block of a GAN and the second subset 306b of style vectors includes the remaining style vectors left unprocessed by the generative neural network in generating the feature tensor 310. For example, in one or more embodiments, the intermediate latent vectors include 18 w-vectors, the style vectors include 18 s-vectors, the feature tensor 310 is generated using the first 7 style vectors, and the second subset of style vectors identified for use in the joint feature style space includes the final 11 style vectors (derived from the final 11 intermediate latent vectors).

In some embodiments, the image projection system 106 divides the style vectors 306b into $S2_{conv}$ and $S2_{rgb}$, where $S2_{conv}$ corresponds to the vectors of style parameters that modulate the first two feature related convolutional layers in each block of the generative neural network 308, and $S2_{rgb}$ corresponds to the vectors of style parameters that modulate the third convolutional layer related to RGB images. Thus, in some instances, the joint feature style code is denoted as $C=[F, S2_{conv}, S2_{rgb}]$.

Although FIG. 3 and the foregoing description indicate a particular architecture, number of vectors, etc. the image projection system 106 can utilize a variety of different architectures and/or vectors. For example, rather than using 18 w-vectors and 18 s-vectors, the image projection system 106 utilizes a different number of vectors (e.g., 20 vectors). Similarly, in one or more embodiments rather than using a feature tensor generated using the first 7 style vectors, the image projection system 106 utilizes a different number of style vectors or generative convolutional blocks to generate the feature tensor (e.g., three or five generative convolutional blocks). Moreover, in one or more embodiments the image projection system 106 utilizes a different second subset of style vectors (e.g., the final 9, 10, or 12 style vectors instead of the final 11 style vectors).

Figure 4:
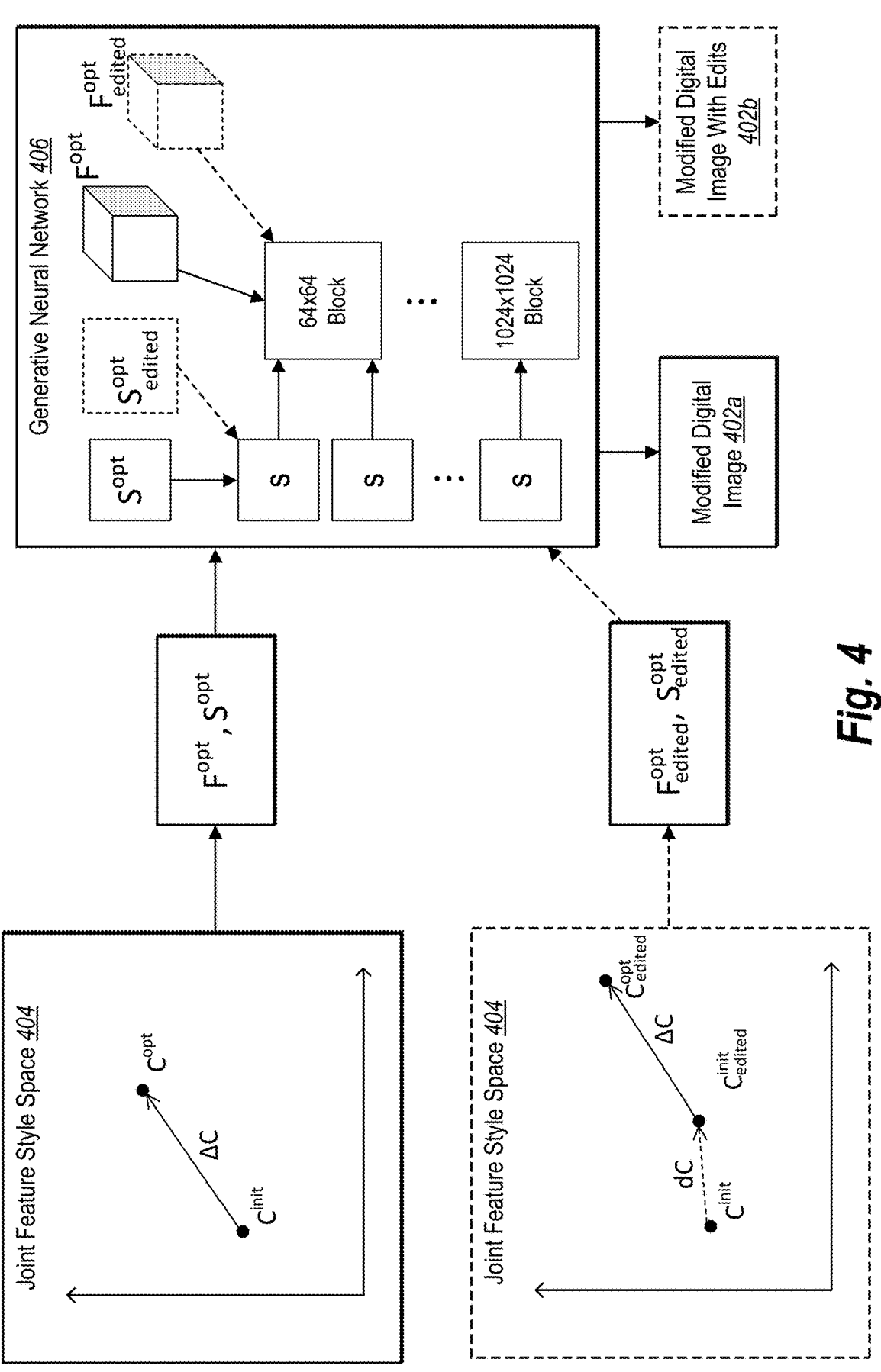
FIG. 4 illustrates modification of a digital image utilizing a joint feature style space in accordance with one or more embodiments.

As discussed previously, in one or more embodiments the image projection system 106 modifies the initial latent code within a joint feature style space. For example, FIG. 4 illustrates the image projection system 106 modifying the initial latent code $C^{init}$ within the joint feature style space 404 by applying a joint feature style perturbation $\Delta C$, resulting in modified latent code $C^{opt}$. As illustrated, the modified latent code $C^{opt}$ includes a modified feature tensor $F^{opt}$ and a set of modified style vectors $S^{opt}$, from which the generative neural network 406 generates a modified digital image 402a. In particular, the image projection system 106 can extract the modified feature tensor $F^{opt}$ and the set of modified style vectors $S^{opt}$ from modified latent code $C^{opt}$ (e.g., by unconcatenating the feature tensor portion and the style vector portion from the modified latent code).

To further illustrate, in some embodiments, starting with the initial latent code $C^{init}$, the image projection system 106 uses the following objective functions to perform a direct optimization of the joint feature style code $C^{opt}$:

$$\underset{C}{\text{argmin}} L_{LPIPS}(C) + \lambda_1 L_F + \lambda_2 L_{S2_{conv}}$$

$$L_F = \left\| F - F^{init} \right\|^2$$

$$L_{S2} = \left\| S2_{conv} - S2^{init}_{conv} \right\|^2$$

where $L_{LPIPS}$ is the LPIPS loss implemented to reduce the reconstruction error, $L_F$ and $L_{S2}$ are regularization terms on the latent code to preserve editability by limiting the difference between the optimized code and the initial code, and $\lambda_1$ and $\lambda_2$ are adjustable weights for modifying the strength of the regularization terms (i.e., to increase or decrease editability of the image by adjusting the strength of the joint feature style perturbation).

As indicated in the equations above, in some embodiments the image projection system 106 refrains from optimizing the RGB related code $S2_{rgb}$ because, at least in some instances, the sliders in the style space only edit the feature-related channels, such that $$S2_{rgb}^{opt} = S2_{rgb}^{init}.$$

In other words, some embodiments of the joint feature style perturbation $\Delta C$ do not include a modification to the $S2_{rgb}$ style vectors in joint feature style space but do include modification(s) to the $S2_{conv}$ style vectors in joint feature style space to reduce a reconstruction error related to those particular layers of the latent code.

Moreover, as shown in FIG. 4, the image projection system 106 optionally receives request to modify a digital image. In particular, in response to receiving a request to modify a digital image the image projection system 106 initiates a modification within the joint feature style space 404. For example, as shown the image projection system 106 determines an image modification vector dC and combines the image modification vector with the initial latent code $C^{init}$. As illustrated, the image projection system 106 determines an edited initial code $$C_{edited}^{init}.$$

Furthermore, the image projection system 106 further combines the edited initial code $$C_{edited}^{init}$$

with the joint feature style perturbation $\Delta C$ to determine a midified feature tensor with edits.

$$C_{edited}^{opt}.$$

As illustrated, the modified latent code $$C_{edited}^{opt}$$

includes a modified feature tensor with edits, $$F_{edited}^{opt},$$

and a set of modified style vectors with edits, $$S_{edited}^{opt},$$

from which the generative neural network 406 generates a modified digital image with edits 402b.

To further illustrate, in one or more embodiments the image projection system 106 starts with the initial JFS code $C^{init}=f_{wp2c}(w_p)$, where $f_{wp2c}$ represents the transformation from intermediate latent space W to the joint feature style space 404, and $w_p$ represents the intermediate latent vectors of the target digital image (e.g., digital image 302 of FIG. 3). With the initial JFS code $C^{init}$ embedded in the joint feature style space 404, the image projection system 106 computes the JFS perturbation $\Delta C=C^{opt}-C^{init}$, then transfers any slider edits $dW_{total}$ from the intermediate latent space to the style space, combining them with any slider edits $dS_{total}$ in the style space to determine edited style vectors $S_{edited}=f_{wp2s}(w_p+dW_{total})+dS_{total}$, where $f_{wp2s}$ represents the transformation from the intermediate latent space W+ to the style space. The image projection system 106 transfers the edited style vectors $S_{edited}$ to the joint feature style space 404 (e.g., as described above in relation to FIG. 3) to determine an initial edited JFS code $$C_{edited}^{init} = f_{s2c}(S_{edited}),$$

where $f_{s2c}$ represents the transformation from the style space to the joint feature style space 404.

As illustrated in FIG. 4, the image projection system 106 generates the modified edited JFS code $$C_{edited}^{opt}$$

by applying the joint feature style perturbation $\Delta C$ to the initial edited JFS code $$C_{edited}^{init}$$

within the joint feature style space 404, such that $$C_{edited}^{opt} = \Delta C + C_{edited}^{init}.$$

Then, utilizing the generative neural network 406, the image projection system 106 generates the modified image with edits 402b or, in other words, generates $$x_{edited} = f_{c2image}(C_{edited}^{opt}),$$

where $x_{edited}$ represents the modified image with edits 402b and $f_{c2image}$ represents the transformation of JFS code C from the joint feature style space 404 into a digital image using generative neural network 406.

As shown in FIG. 4, the image projection system 106 utilizes the modified style vectors, $S^{opt}$ or $$S_{edited}^{opt},$$

to generate the modified digital image 402a (or the modified digital image with edits 402b). In particular, the image projection system 106 replaces the style vectors (from FIG. 3) with the modified style vectors and replaces the feature tensor (from FIG. 3) with the modified feature tensor. The image projection system 106 then utilizes the remaining generative convolutional blocks to process the modified style vectors and the modified feature tensor to generate a modified digital image.

Figures 5A, 5B:
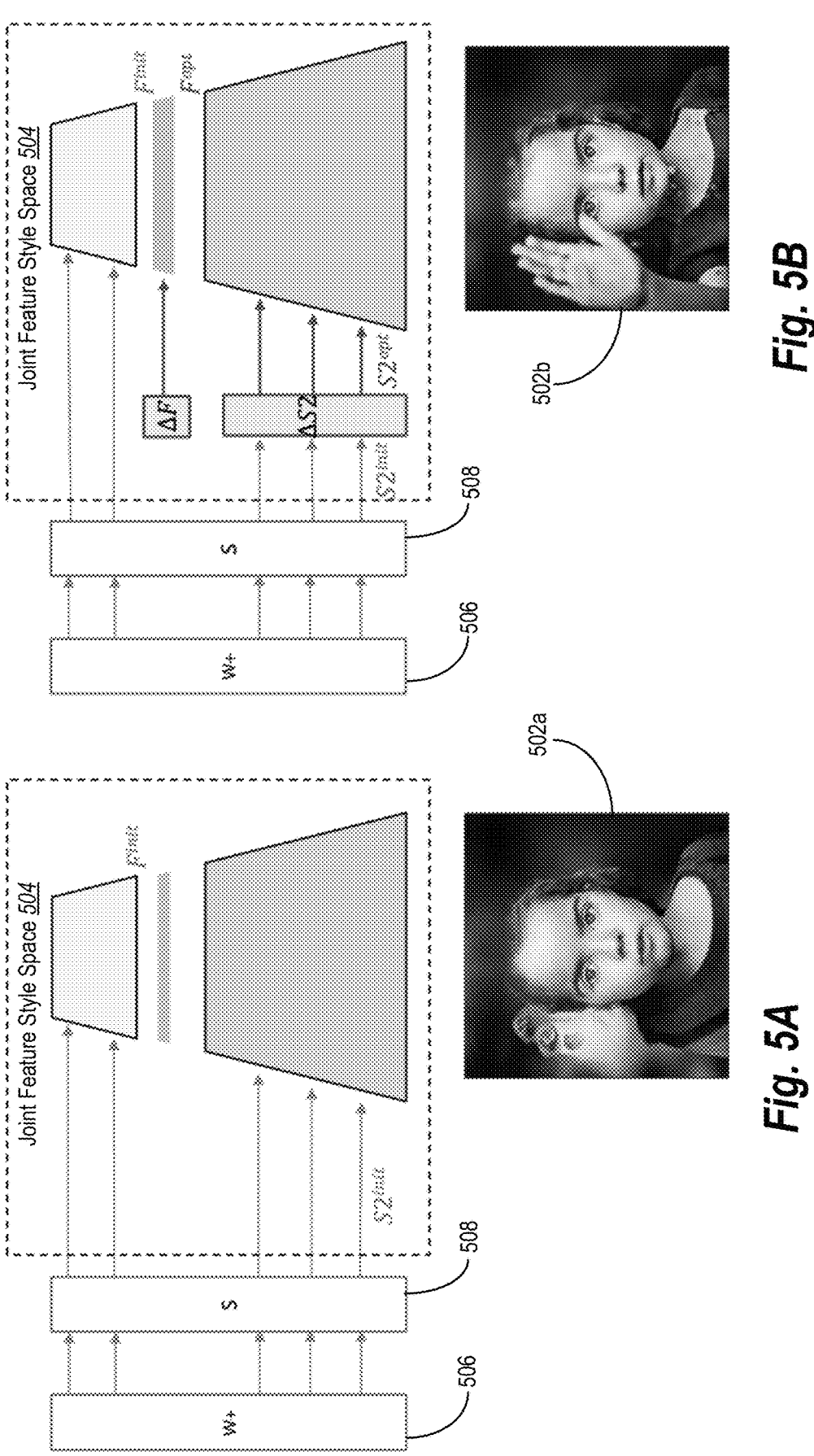
FIG. 5A illustrates generating a digital image utilizing a joint feature style space in accordance with one or more embodiments.
FIG. 5B illustrates generating a digital image utilizing a joint feature style perturbation in a joint feature style space in accordance with one or more embodiments.

As mentioned above, in some embodiments the image projection system 106 uses a joint feature style perturbation to modify a digital image and reduce a reconstruction error between an input digital image and the modified digital image generated by the image projection system 106. To further illustrate, FIGS. 5A-5B show reconstruction of a digital image utilizing a joint feature style space in accordance with one or more embodiments. More specifically, FIG. 5A illustrates reconstruction of a digital image 502*a* without introducing a joint feature style perturbation, whereas FIG. 5B illustrates reconstruction of the digital image 502*b* modified by the joint feature style perturbation. As shown, there is a significant difference between the generated images, demonstrating a notable improvement in the generated digital image. See, for instance, the distortion of the hand in reconstructed image 502*a* versus the clarity thereof in reconstructed image 502*b*.

As shown in FIGS. 5A-5B, some embodiments of the image projection system 106 project a set of latent vectors from an intermediate latent space 506 (e.g., the W+ space, as shown) to a style space 508 to generate style vectors S. Utilizing a first subset of the style vectors S, the image projection system 106 generates an initial feature tensor $F^{init}$ using a generative neural network (e.g., a GAN), and combines the initial feature tensor $F^{init}$ with a second subset $S2^{init}$ of the style vectors S within a joint feature style space 504. As illustrated in FIG. 5B, the image projection system 106 introduces a joint feature style perturbation within the joint feature style space 504, the joint feature style perturbation including a feature tensor component $\Delta F$ and a style vector component $\Delta S2$. Accordingly, as illustrated in FIG. 5B, the image projection system 106 generates a modified feature tensor $F^{opt}$ by combining the initial feature tensor $F^{init}$ with the feature tensor component $\Delta F$ of the joint feature style perturbation, and also generates a modified style vectors $S2^{opt}$ by combining the second subset $S2^{init}$ of style vectors S with a style vector component $\Delta S2$ of the joint feature style perturbation.

Moreover, as illustrated, the image projection system 106 then utilizes the modified feature tensor $F^{opt}$ and the modified style vectors $S2^{opt}$ to generate a digital image. In particular, the image projection system 106 processes the modified feature tensor $F^{opt}$ and the modified style vectors $S2^{opt}$ with additional generative convolutional blocks to generate the digital image 502*b*. For example, the image projection system 106 utilizes a first generative convolutional block to process the feature tensor $F^{opt}$ and one or more modified style vectors to generate an additional feature tensor. The image projection system 106 utilizes a second generative convolutional block to process the additional feature tensor and an additional set of modified style vectors to generate a subsequent feature tensor. In one or more embodiments, the image projection system 106 iteratively generates feature tensors utilizing different generative convolutional blocks until generating the digital image 502*b*.

Figure 6:
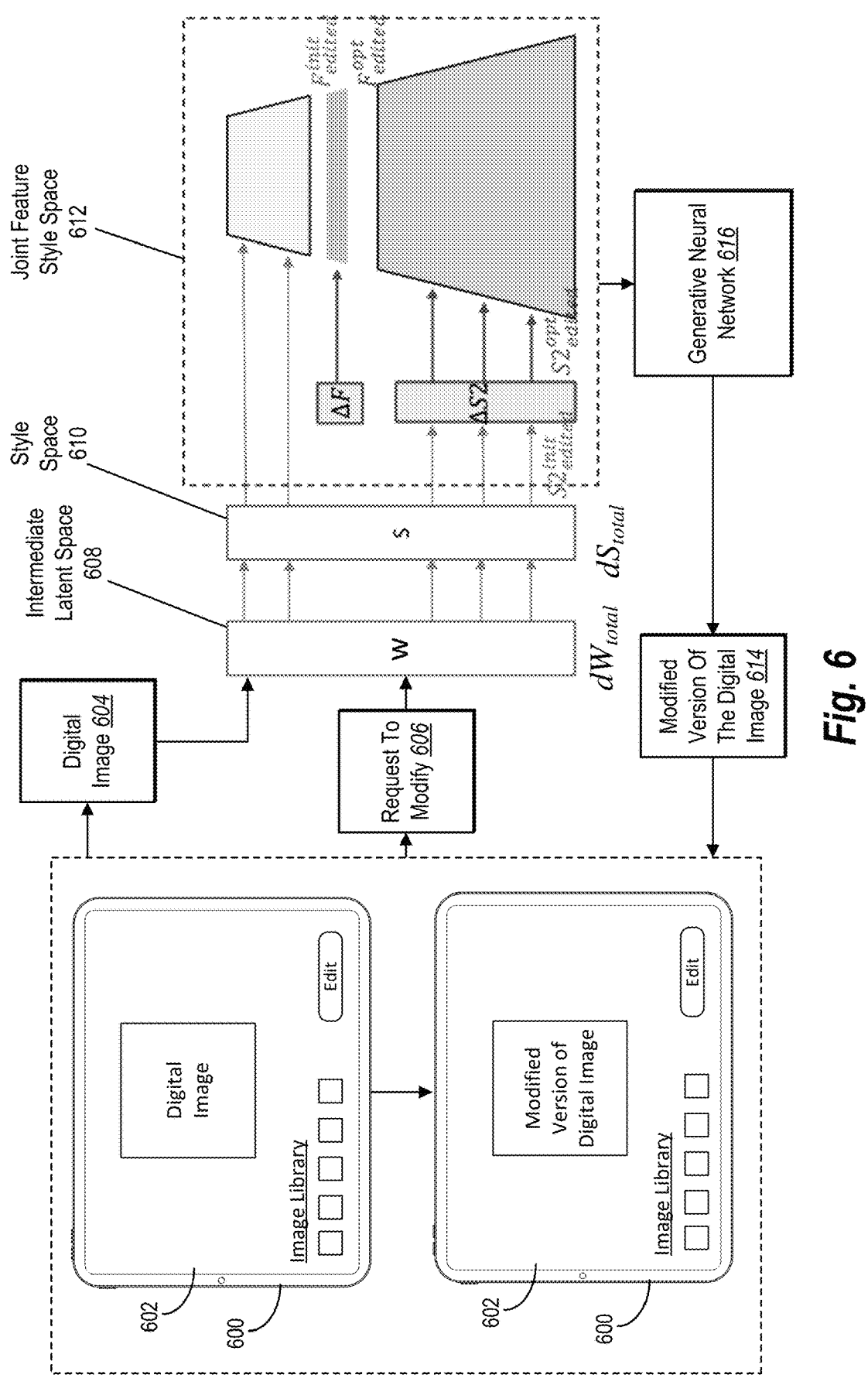
FIG. 6 illustrates an image projection system generating a modified version of a target digital image in response to a modification request in accordance with one or more embodiments.

As previously mentioned, in some embodiments, the image projection system 106 receives a request to modify a target digital image and generates a modified version of the target digital image by importing one or more image modification vectors to a joint feature style space. For instance, FIG. 6 illustrates the image projection system 106 receiving a request to modify 606 a target digital image 604 and generating a modified version of the target digital image 614 in accordance with one or more embodiments. Indeed, FIG.

6 illustrates the image projection system 106 utilizing image modification vectors within a joint feature style space 612 to generate a modified version of the target digital image 614.

For example, as shown in FIG. 6, the image projection system 106 receives the request to modify 606 the digital image 604 displayed on a graphical user interface 602 of a client device 600 (e.g., operating a digital graphics application). The image projection system 106 can receive this request in a variety of ways. For example, in some implementations, the graphical user interface 602 includes a slider element that allows a user to adjust one or more features of a digital image (e.g., age, head tilt, etc.). In some implementations, the graph user interface 602 includes alternative user interface for implementation style changes (e.g., text boxes, radio buttons, or voice interaction controls)

In response to receiving the request to modify 604, the image projection system 106 identifies or generates a set of intermediate latent vectors W, then embeds the set of intermediate latent vectors W into a style space 610 to generate a set of style vectors S. Additionally, if the request to modify 606 includes any modifications applicable within the intermediate latent space 608 (e.g., any sliders previously developed within the W+ latent space), the image projection system 106 identifies one or more image modification vectors dW corresponding to the requested modification.

Subsequently, the image projection system 106 embeds the intermediate latent vectors W into a style space 610 to generate style vectors S, and embeds any image modification vectors dW corresponding to the request to modify 606 into the style space 610 to generate one or more image modification vectors dS. Additionally, if applicable to the request to modify 606, the image projection system 106 identifies one or more image modification vectors within the style space 610 and combines them with any image modification vectors dS imported from the intermediate latent space 608 to determine a total image modification vector $dS_{total}$. In one or more embodiments, the image projection system 106 maps these image modification vectors between spaces utilizing the neural network architectures described above (e.g., utilizing convolutional layers, learned transformers, and/or generative convolutional blocks).

As previously described, the illustrated image projection system 106 generates an initial edited feature tensor $$F^{init}_{edited}$$

utilizing a generative neural network to embed a first subset of the style vectors S and the image modification vectors $dS_{total}$ into the joint feature style space 612. The image projection system 106 also embeds a second subset of style vectors S and image modification vectors $dS_{total}$ into the joint feature style space 612 to generate initial edited style vectors $$S2^{init}_{edited}.$$

With the initial edited feature tensor $$F^{init}_{edited}$$

and the initial edited style vectors $$S2_{edited}^{init}$$

embedding into the joint feature style space 612, the illustrated image projection system 106 applies a joint feature style perturbation to reduce a reconstruction loss between the digital image 604 and the modified version of the digital image 614, as discussed previously. More specifically, the image projection system 106 generates a modified edited feature tensor $$F_{edited}^{opt}$$

by combining the initial edited feature tensor $$F_{edited}^{init}$$

with a feature tensor component $\Delta F$ of the joint feature style perturbation, and generates a modified edited style vector $$S2_{edited}^{opt}$$

by combining the initial edited style vectors $$S2_{edited}^{init}$$

with a style vector component $\Delta S2$ of the joint feature style perturbation.

As further illustrated in FIG. 6, the image projection system 106 then inputs the modified edited feature tensor $$F_{edited}^{opt}$$

and the modified edited style vector $$S2_{edited}^{opt}$$

into a generative neural network 616 to generate a modified version of the digital image 614 (as described above). As shown in FIG. 6, the image projection system 106 provides the modified version of the digital image 614 for display on the graphical user interface 602 of the client device 600.

As previously mentioned, in some embodiments the image projection system 106 determines a joint feature style perturbation within the joint feature style space to reduce a reconstruction error between a target digital image and a modified digital image generated by the system. In some embodiments, for example, the joint feature style perturbation is calculated using a gradient descent optimization model, such as but not limited to an Adam optimizer. To further illustrate, FIG. 7 shows an exemplary optimization model 702 for determining a joint feature style perturbation $\Delta C$ for an original digital image 704.

Figure 7:
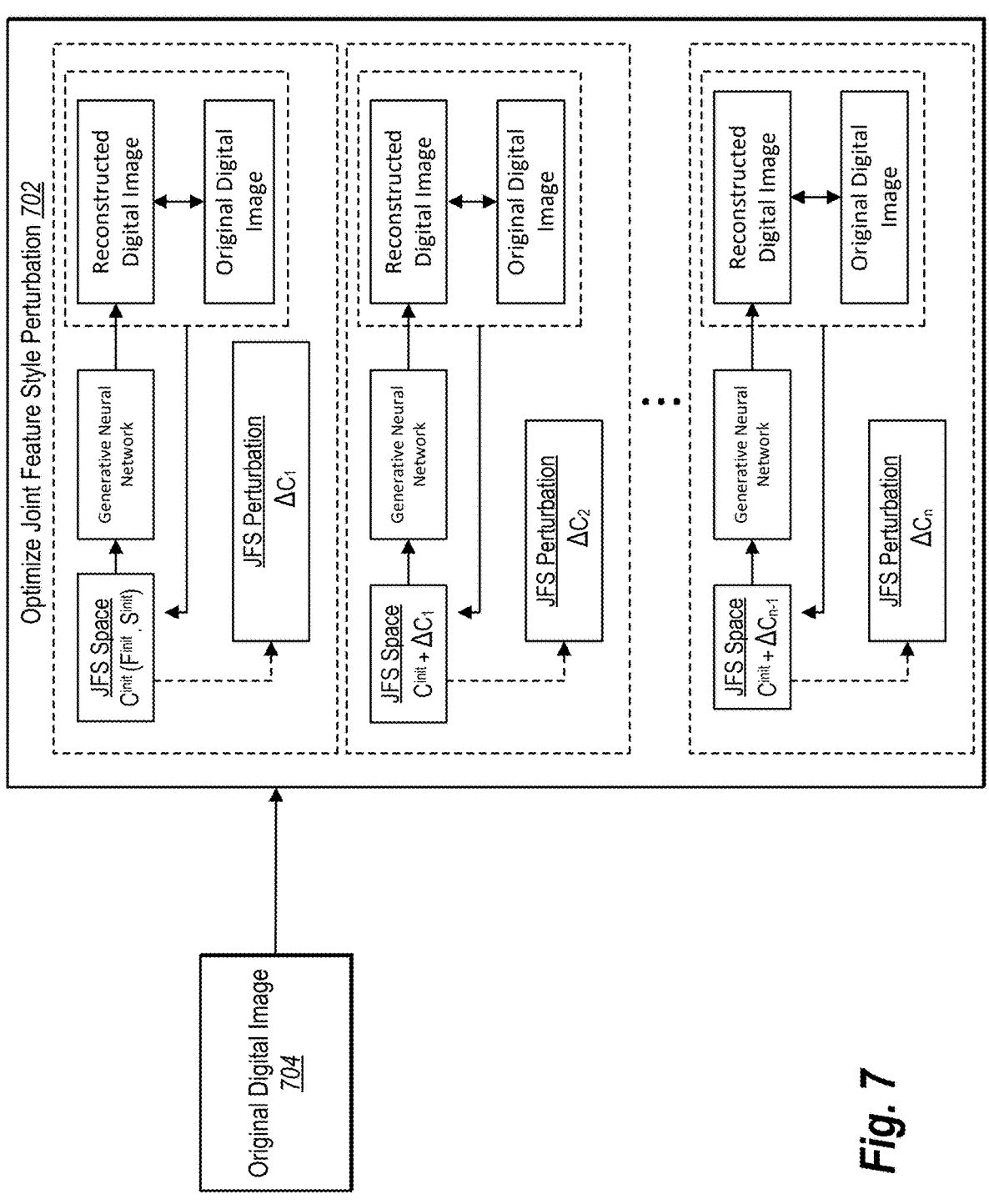
FIG. 7 illustrates utilizing an optimization model to determine a joint feature style perturbation in accordance with one or more embodiments.

As shown in FIG. 7, in certain implementations, the image projection system 106 calculates a joint feature style perturbation $\Delta C$ for an input original digital image 704 by iterative reduction of a reconstruction error between the original digital image 704 and a reconstructed digital image generated utilizing a joint feature style space and a generative neural network. As illustrated, for instance, a first iteration of the optimization model 702 starts by embedding the original digital image 704 into a joint feature style space to determine an initial joint feature style code $C^{init}$ for the digital image 704. The initial joint feature style code includes initial style vectors $S^{init}$ and an initial feature tensor $F^{init}$, from which the image projection system 106 generates a reconstructed digital image using the generative neural network. The image projection system 106 compares the reconstructed digital image with the original digital image to estimate a first iteration $\Delta C_1$ of the joint feature style perturbation $\Delta C$.

For example, in one or more embodiments, the image projection system 106 determines a reconstruction loss between the original digital image 704 and the reconstructed digital image. The image projection system 106 then utilizes this reconstruction loss to determine the joint feature style perturbation. In particular, the image projection system 106 utilizes the reconstruction loss to determine a gradient (e.g., utilizing a gradient descent algorithm) pointing toward a joint feature style perturbation that will reduce the reconstruction loss.

As illustrated in FIG. 7, the second iteration of the optimization model 702 includes combining the joint feature style perturbation $\Delta C_1$ of the first iteration with the initial joint feature style code $C^{init}$, generating another reconstructed digital image, and comparing the reconstructed digital image to the original digital image to estimate a second iteration $\Delta C_2$ of the joint feature style perturbation $\Delta C$. As shown, each subsequent iteration includes combining the joint feature style perturbation $\Delta C_{n-1}$ of the previous iteration with the initial joint feature style code $C^{init}$, generating another reconstructed digital image, and comparing the reconstructed digital image to the original digital image to estimate a subsequent iteration $\Delta C_n$ of the joint feature style perturbation $\Delta C$. Accordingly, the illustrated optimization model 702 can be performed for any number of iterations to optimize the joint feature style perturbation $\Delta C$.

Figure 8:
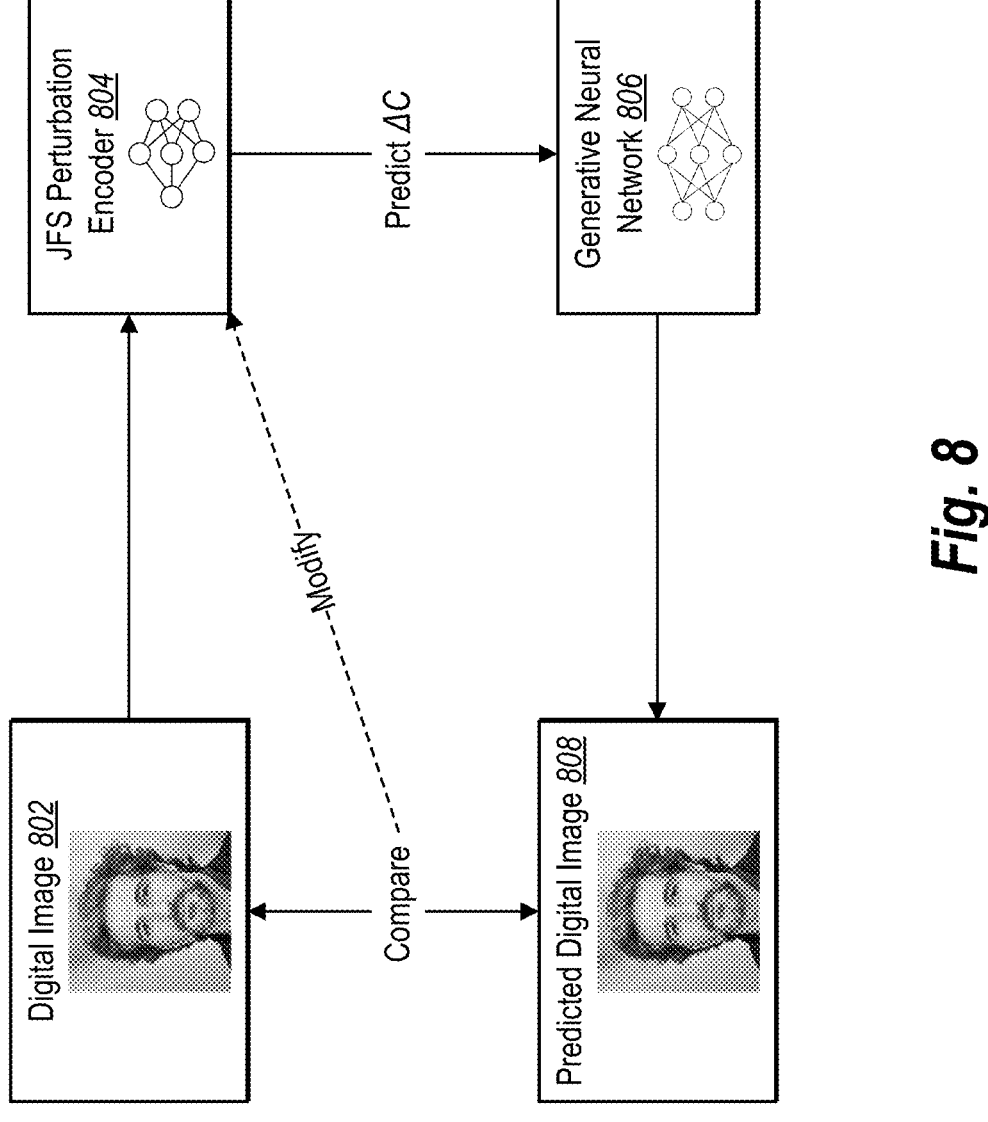
FIG. 8 illustrates training a neural network encoder to estimate a joint feature style perturbation in accordance with one or more embodiments.

As mentioned above, in one or more embodiments, the image projection system 106 utilizes a trained encoder to determine a joint feature style perturbation for a target digital image. For example, FIG. 8 illustrates the image projection system 106 training a neural network encoder (i.e., a JFS perturbation encoder 804) to estimate joint feature style perturbations $\Delta C$ for input digital images.

As illustrated, in one or more embodiments, the JFS perturbation encoder 804 receives an input digital image 802 and predicts a joint feature style perturbation $\Delta C$ utilizing a set of learned parameters and weights. To illustrate, in one or more implementations the image projection system 106 utilizes an encoder that includes a plurality of convolutional layers that analyze the digital image 802 to generate a predicted joint feature style perturbation. The image projection system 106 can utilize a variety of encoding architectures for the JFS perturbation encoder 804.

The image projection system 106 utilizes the predicted joint feature style perturbation to further train the JFS perturbation encoder 804. As illustrated, the image projection system 106 utilizes the predicted joint feature style perturbation $\Delta C$ to modify the digital image 802 in joint feature style space. Moreover, the image projection system 106 utilizes a generative neural network 806 to generate a predicted digital image 808 (e.g., a digital image reflecting the predicted JFS joint feature style perturbation. The image projection system 106 compares the predicted digital image 808 with digital image 802 to determine modifications to the learned parameters and weights of the JFS perturbation encoder 804.

Specifically, the image projection system 106 compares the predicted digital image 808 and the digital image 802 utilizing a loss function (e.g., a reconstruction loss function) to determine a measure of loss. The image projection system 106 utilizes the measure of loss to modify the learned parameters and weights of the JFS perturbation encoder 804. For example, the image projection system 106 utilizes backpropagation to modify the learned parameters to reduce the reconstruction loss between the digital image 802 and the projected digital image 808.

Accordingly, the JFS perturbation encoder 804 can be trained by a set of digital images 802 to modify (i.e., train) the learned parameters and weights utilized to predict the joint feature style perturbation ΔC for any target digital image 802. In some embodiments, the joint feature style perturbation ΔC predicted by the JFS perturbation encoder 804 is further optimized (e.g., as described above in relation to FIG. 7) to further reduce the reconstruction error between the target digital image 802 and the predicted (i.e., modified or reconstructed) digital image 808.

To further illustrate, in some embodiments the image projection system 106 utilizes the following algorithm to train the JFS perturbation encoder to predict joint feature style perturbations:

1. Project input image x to W+ latent space to obtain latent code $w_p$.
2. Get initial JFS code $$C^{init} = \left[ F^{init}, S2_{conv}^{init}, S2_{rgb}^{init} \right]$$

by transferring $w_p$ to JFS space.
3. Get intermediate perturbation $\Delta C^{inter}$ using JFS perturbation encoder.
4. Initialize JFS space latent code $C^{opt}$ with $C^{inter}=C^{init}+\Delta C^{inter}$
5. Use gradient descent optimization (e.g., utilizing the Adam Optimization Algorithm) to minimize the objective function (e.g., objection functions presented in relation to FIG. 4).
6. Return $$C^{opt} = \left[ F^{opt}, S2_{conv}^{opt}, S2_{rgb}^{init} \right]$$

from step 4 above.

Figure 9:
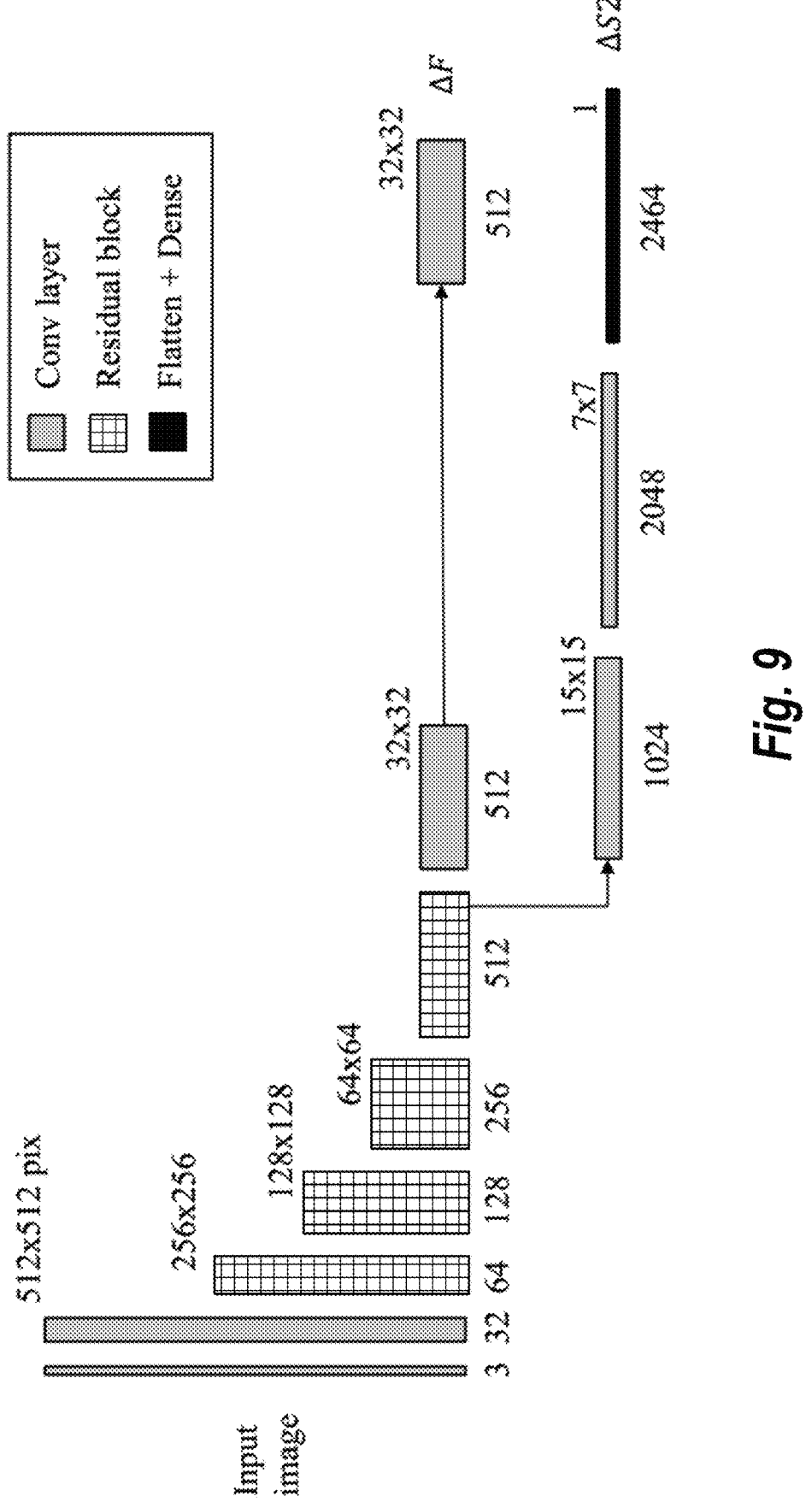
FIG. 9 illustrates a network structure of a joint feature style encoder in accordance with one or more embodiments.

Additionally, FIG. 9 illustrates an exemplary network structure of a neural network encoder for determining a joint feature style perturbation. The image projection system 106 utilizes the illustrated joint feature style encoder to generate a perturbation of the feature tensor ΔF and a perturbation of the style vectors ΔS2. As mentioned, the image projection system 106 utilizes these perturbations within joint feature style space to reduce reconstruction error.

As illustrated, the exemplary neural network encoder includes a plurality of convolutional layers and residual blocks that process a digital image at different levels of granularity/abstraction. In particular, as shown, the image projection system 106 utilizes a 512×512 convolutional layer to analyze the initial digital image, followed by a 256×256 residual block, a 128×128 residual block, a 64×64 residual block, etc. Moreover, the image projection system 106 utilizes two 32×32 convolutional layers to predict the feature tensor component of the joint feature style perturbation (ΔF). In addition, the image projection system 106 utilizes a 15×15 convolutional layer and a 7×7 convolutional layer (followed by a flattening and fully connected densification layer) to generate the style vector component of the joint feature style perturbation (ΔS2).

The illustrated network structure, for example, when utilized in conjunction with a loss function, is trained on a dataset of aligned face images to reduce a loss function by adjusting various parameters and weights (e.g., as described above in relation to FIG. 8). For example, the following loss function can be utilized to reduce reconstruction error:

$$L_{total}=L_1(x,x_{rec})+L_{LPIPS}(x,x_{rec})+L_2(\Delta F)+L_2(\Delta S2)$$

where $L_{total}$ represents the total reconstruction error, x represents the original latent code of a digital image, $x_{rec}$ represents the modified latent code of the digital image, and ΔF and ΔS2 represent a feature tensor and style vectors of the digital image as encoded in joint feature style space. $L_1$ refers to an $L_1$ loss function, $L_{LPIPS}$ refers to a learned perceptual image patch similarity loss (e.g., a perceptual loss), and $L_2$ refers to an $L_2$ loss function. In particular, the first two terms of the above equation are used to reduce the reconstruction error of the modified digital image, and the final two terms penalize the perturbation to limit the magnitude of the perturbation (i.e., to limit the effects of the perturbation on the modified digital image to maintain the ability of the image projection system 106 to edit the target digital image).

Figure 10:
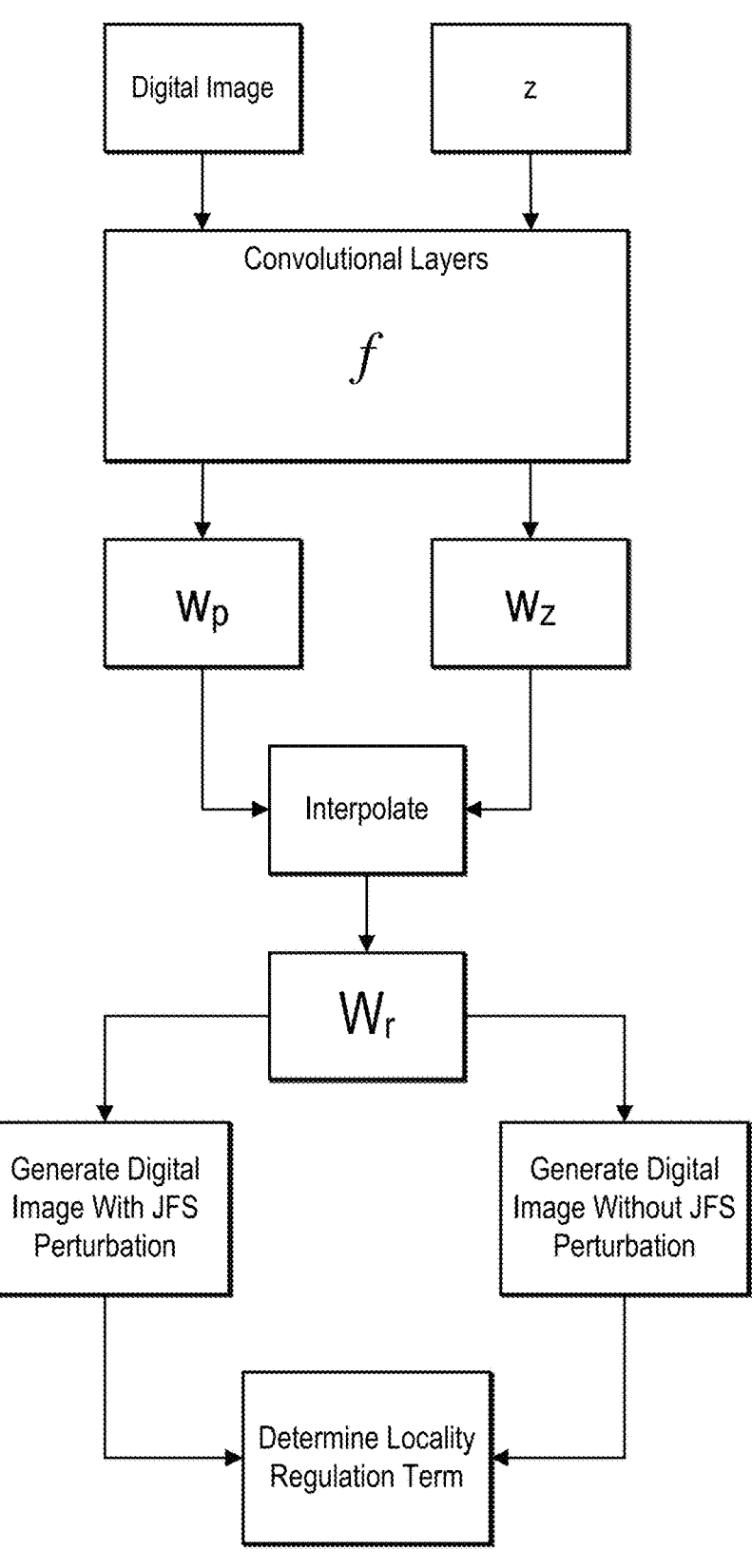
FIG. 10 illustrates determining a locality regularization term in accordance with one or more embodiments.

As mentioned previously, in some embodiments the image projection system 106 utilizes a locality regularization term in determining the joint feature style perturbation to restrict changes in local regions within latent space to reduce the introduction of artifacts while maintaining editability of the digital image. For instance, FIG. 10 illustrates an optimization process for determining a locality regularization term in accordance with one or more embodiments. For example, in each iteration of optimization, the image projection system 106 extracts a random latent vector z from initial latent code Z corresponding to a target digital image and maps the random latent vector z to an intermediate latent space (e.g., the W or W+ space) using convolutional layers (denoted f) to generate random intermediate latent vector $w_z$. As shown, the image projection system 106 determines an interpolated code $w_r$ by interpolating between the random intermediate latent vector $w_z$ and the intermediate latent vector $w_p$ projected from the initial latent code Z using f. For example, in one or more embodiments, the interpolated code is calculated by:

$$w_r = w_p + \alpha \frac{w_z - w_p}{\|w_z - w_p\|_2}$$

where α represents an adjustable interpolation parameter.

With the interpolated code $w_r$, the image projection system 106 determines a locality regularization term by comparing a digital image generated with a joint feature style perturbation and a digital image generated without the joint feature style perturbation, minimizing the difference between the two digital images, such that, for example:

$$L_R = L_{LPIPS}(x_r, x_r^*)$$

where $L_R$ is the locality regularization term (in some embodiments, to be combined with the joint feature style perturbation $L_{total}$ as described in relation to FIG. 9 above), $x_r$ represents the digital image reconstructed without perturbation, and $$x_r^*$$

represents the digital image reconstructed with perturbation. For instance, in some of more embodiments, the locality regularization term is added to the objective function discussed above (in relation to FIG. 4) as follows:

$$\arg \min_C L_{LPIPS}(C) + \lambda_1 L_F + \lambda_2 L_{S2} + \lambda_3 L_R$$

Figure 12:
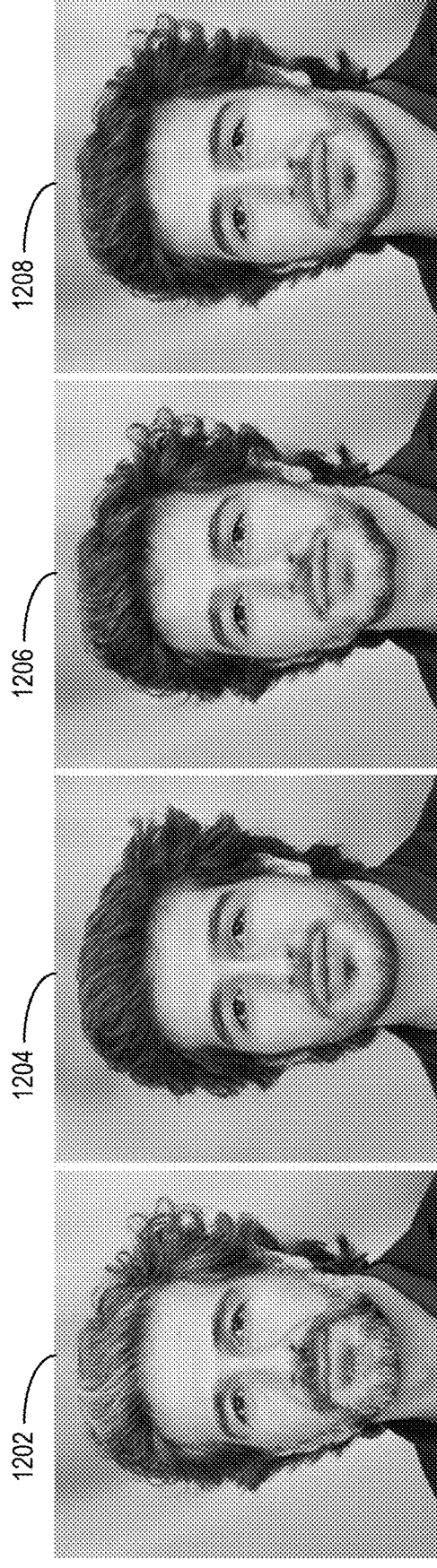

Exemplary results of the effects of the locality regularization term are shown in FIG. 12 and discussed below.

Figure 11:
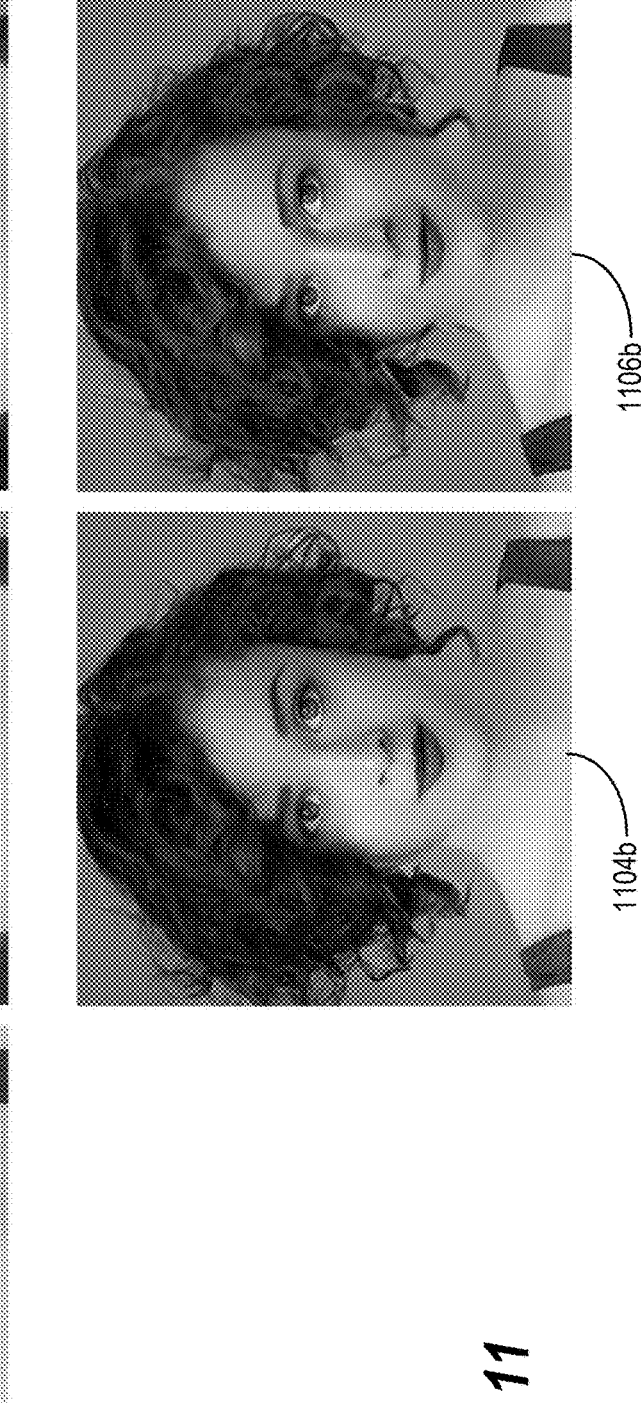
FIGS. 11-13 illustrate experimental results of an image projection system utilizing a joint feature style space in accordance with one or more embodiments.
Figure 13:

To further illustrate, FIGS. 11-13 show experimental results of an image projection system 106 utilizing various elements of the disclosed embodiments. For instance, FIG. 11 shows multiple edited reconstructions of an original digital image 1102, wherein digital image 1104*a* is an example of a digital image edited to reduce the appearance of age utilizing conventional methods (i.e., without the joint feature style space), and digital image 1104*b* is an example of a digital image edited to reduce the appearance of age with the use of the joint feature style space as disclosed herein. As further examples, digital image 1106*a* is an example of a digital image edited to yaw the face of the image subject to the left utilizing conventional methods (i.e., without the joint feature style space), and digital image 1106*b* is an example of a digital image edited to yaw the face of the image subject to the left with the use of the joint feature style space as disclosed herein. Indeed, as shown in FIG. 11, the modified digital images 1104*b*, 1106*b* (generated from latent code modified within the joint feature style space) have a higher fidelity in comparison to the modified digital images 1104*a*, 1106*a* (generated from latent code modified by conventional methods).

Additionally, FIG. 12 shows an example of the effects of locality regularization as utilized in one or more embodiments. For instance, FIG. 12 includes an original digital image 1202 and three modified digital images 1204, 1206, 1208 edited and reconstructed to reduce the appearance of the image subject's age. Specifically, FIG. 12 includes modified digital image 1204 generated from latent code edited within a style space, modified digital image 1206 generated from latent code edited within a joint feature style space utilizing a joint feature style perturbation without locality regularization, and modified digital image 1208 generated from latent code edited within a joint feature style space utilizing a joint feature style perturbation developed with locality regularization. Indeed, as shown in FIG. 12, the modified digital images 1206 and 1208 (both edited within a joint feature style space) have a higher fidelity in comparison to the modified digital image 1204 (edited within a style space). Further still, the modified digital image 1208 (edited using a locality regularization term) reduces the appearance of artifacts (e.g., distortion/ripples in the subject's chin) in comparison with modified digital image 1206 (edited without a locality regularization term).

Moreover, FIG. 13 shows an example of the effects of joint feature style perturbations calculated by the various methods described above. For example, FIG. 13 includes an original digital image 1302, a modified digital image 1304 edited and generated by conventional methods (i.e., without a joint feature style space or perturbation), a modified digital image 1306 edited in joint feature style space utilizing a joint feature style perturbation determined via gradient descent optimization (e.g., as discussed in relation to FIG. 7), a modified digital image 1308 edited in joint feature style space utilizing a joint feature style perturbation predicted by a learned encoder (e.g., as discussed in relation to FIG. 8), and a modified digital image 1310 edited in joint feature style space utilizing a joint feature style perturbation predicted by a learned encoder and further optimized via gradient descent optimization.

Indeed, as shown in FIG. 13, each of the modified digital images 1306, 1308, and 1310 (edited using a joint feature style perturbation) present notable improvements in fidelity to the original digital image 1302 (e.g., the size and texture of the subject's hair, torso, and jawline) over the modified digital image 1304 (edited by conventional methods). Moreover, while digital image 1306 (edited with a joint feature style perturbation determined via gradient descent optimization) and digital image 1310 (edited with a joint feature style perturbation predicted by a learned encoder and further optimized via gradient descent optimization) exhibit similar fidelity to the original digital image 1302, use of the learned encoder also demonstrates an improvement in efficiency, reducing, in some instances, the time to project the modified digital image by an order of magnitude (e.g., from 25 seconds to 3.6 seconds in the example shown).

Figure 14:
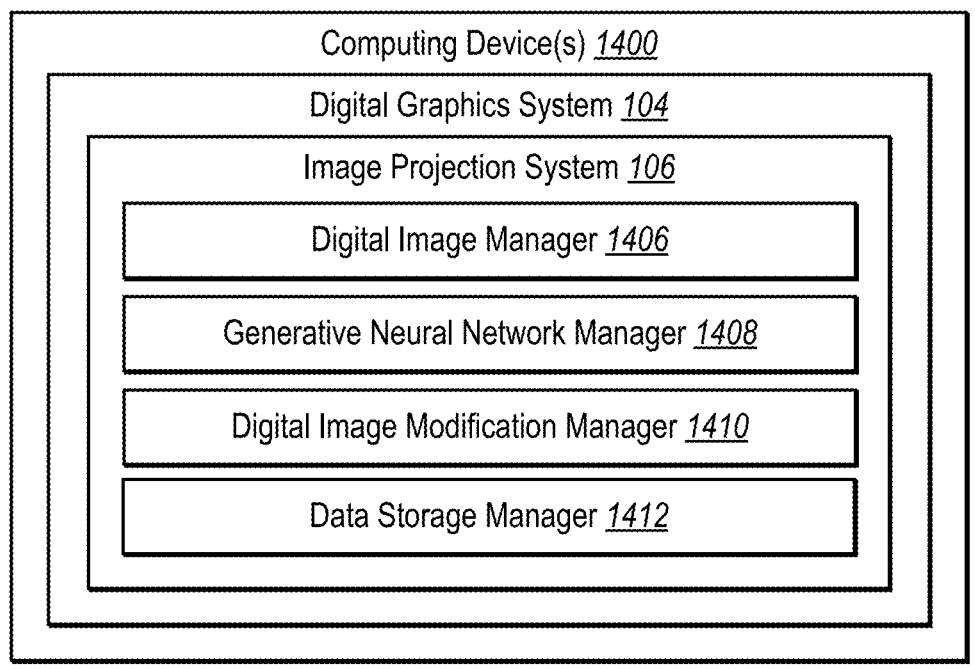
FIG. 14 illustrates a schematic diagram of an image projection system in accordance with one or more embodiments.

Turning now to FIG. 14, additional detail will be provided regarding components and capabilities of one or more embodiments of the image projection system 106. In particular, FIG. 14 illustrates an example image projection system 106 executed by a computing device 1400 (e.g., the server devices(s) 102 of the client device 110). As shown by the embodiment of FIG. 14, the computing device 1400 includes or hosts a digital graphics system 104 and the image projection system 106. Furthermore, as shown in FIG. 14, the image projection system 106 includes a digital image manager 1406, a generative neural network manager 1408, a digital image modification manager 1410, and a data storage manager 1412.

As just mentioned, and as illustrated in the embodiment of FIG. 14, the image projection system 106 includes the digital image manager 1406. For instance, the digital image manager 1406 identifies, stores, transmits, and/or displays digital images (and/or digital videos) as described above (e.g., in relation to FIGS. 1, 2, and 6). In some instances, the digital image manager 1406 stores digital images with corresponding initial latent code/vectors, and/or initial joint feature style code (i.e., feature tensors and style vectors) and/or image-specific joint feature style perturbations (generated in accordance with one or more embodiments) as described above (e.g., in relation to FIGS. 1-10).

Furthermore, as shown in FIG. 14, the image projection system 106 includes the digital modification manager 1406. For instance, the digital image modification manager 1406 modifies the latent code of a digital image (utilizing a joint feature style space in accordance with one or more embodiments) that, when utilized with a generative neural network, converts into a modified version of a digital image as described above (e.g., in relation to FIGS. 2-6). Additionally, in one or more embodiments, a generative neural network manager 1408 generates feature tensors and generates modified digital images as described above (e.g., in relation to FIGS. 2-10). Moreover, in one or more embodiments, the generative neural network manager 1408 utilizes an encoder to predict joint feature style perturbations for target digital images as described above (e.g., in relation to FIGS. 8-9).

In addition, as shown in FIG. 14, the image projection system 106 includes the digital image modification manager 1410. For instance, the digital image modification manager 1410 modifies the latent code of a target digital image utilizing image modification vectors and a joint feature style perturbation as described above (e.g., in relation to FIGS. 2 and 4-6).

As also shown in FIG. 14, the image projection system 106 includes the data storage manager 1412. In some embodiments, the data storage manager 1412 is implemented by one or more memory devices. Additionally, in certain instances, the data storage manager 1412 maintains data to perform one or more functions of the image projection system 106. For example, the data storage manager 1412 includes digital images, latent code (e.g., initial and intermediate latent vectors, feature tensors, image modification vectors, and joint feature style perturbations) and/or generative neural network components (e.g., neural network parameters, neural network channel weights, GAN data, GAN parameters).

Each of the components 1406-1412 of the image projection system 106 can include software, hardware, or both. For example, the components 1406-1412 can include one or more instructions stored on a computer-readable storage medium and executable by processors of one or more computing devices, such as a client device or server device. When executed by the one or more processors, the computer-executable instructions of the image projection system 106 can cause the computing device(s) 1400 to perform the methods described herein. Alternatively, the components 1406-1412 can include hardware, such as a special-purpose processing device to perform a certain function or group of functions. Alternatively, the components 1406-1412 of the image projection system 106 can include a combination of computer-executable instructions and hardware.

Furthermore, the components 1406-1412 of the image projection system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1406-1412 may be implemented as a stand-alone application, such as a desktop or mobile application. Furthermore, the components 1406-1412 may be implemented as one or more web-based applications hosted on a remote server. The components 1406-1412 may also be implemented in a suite of mobile device applications or "apps." To illustrate, the components 1406-1412 may be implemented in an application, including but not limited to, ADOBE PHOTOSHOP, ADOBE PREMIERE, ADOBE LIGHTROOM, ADOBE ILLUSTRATORE, ADOBE SUBSTANCE, ADOBE CREATIVE CLOUD, or ADOBE SENSEI. "ADOBE," "ADOBE PHOTOSHOP," "ADOBE PREMIERE," "ADOBE LIGHTROOM," "ADOBE ILLUSTRATORE," "ADOBE SUBSTANCE," "ADOBE CREATIVE CLOUD," and "ADOBE SENSEI" are either registered trademarks or trademarks of Adobe Systems Incorporated in the United States and/or other countries.

Figure 15:
FIG. 15 illustrates a flowchart of a series of acts for generating a modified digital image utilizing a joint feature style space in accordance with one or more embodiments.
Figure 15:
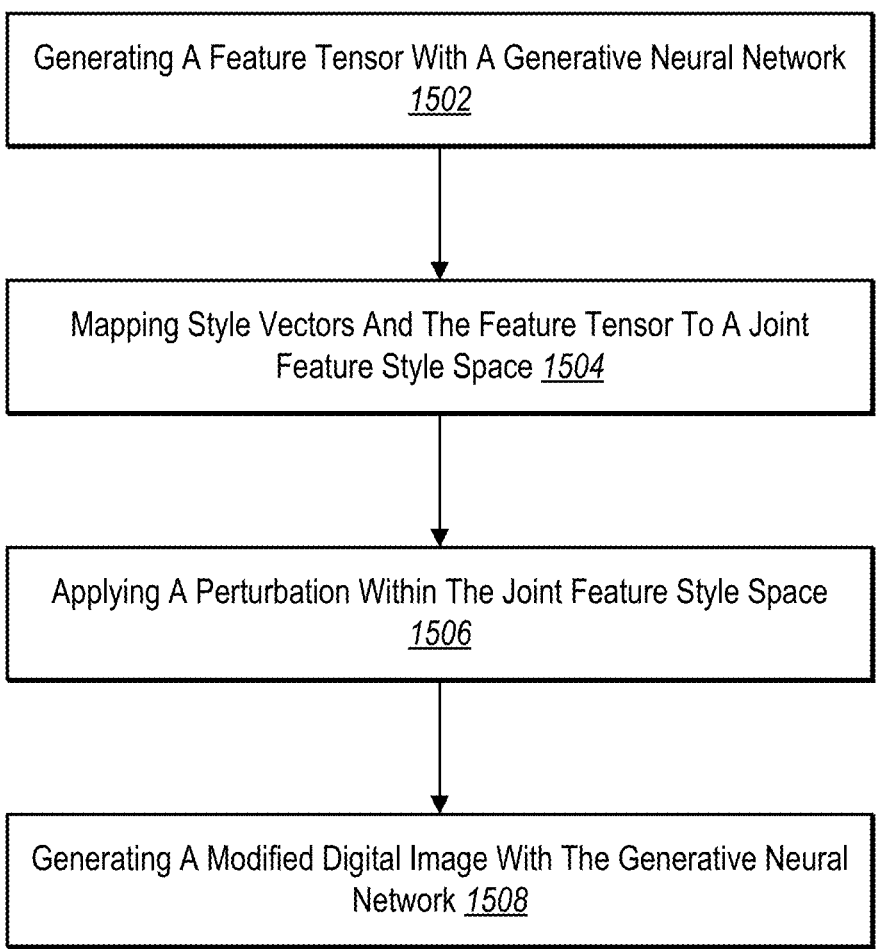

FIGS. 1-14, the corresponding text, and the examples provide a number of different methods, systems, devices, and non-transitory computer-readable media of the image projection system 106. In addition to the foregoing, one or more embodiments can also be described in terms of flowcharts comprising acts for accomplishing a particular result, as shown in FIG. 15. The acts shown in FIG. 15 may be performed in connection with more or fewer acts. Further, the acts may be performed in differing orders. Additionally, the acts described herein may be repeated or performed in parallel with one another or parallel with different instances of the same or similar acts. A non-transitory computer-readable medium can comprise instructions that, when executed by one or more processors, cause a computing device to perform the acts of FIG. 15. In some embodiments, a system can be configured to perform the acts of FIG. 15. Alternatively, the acts of FIG. 13 can be performed as part of a computer-implemented method.

As mentioned above, FIG. 15 illustrates a flowchart of a series of acts 1500 for generating a modified digital image in accordance with one or more embodiments. While FIG. 15 illustrates acts according to one embodiment, alternative embodiments may omit, add to, reorder, and/or modify any acts shown in FIG. 15.

As shown in FIG. 15, the series of acts 1500 include an act 1502 of generating a feature tensor with a generative neural network. In particular, in one or more embodiments, the act 1502 includes generating a feature tensor for a digital image from a first subset of style vectors utilizing a generative neural network. In some embodiments, act 1502 can include generating intermediate latent vectors from the digital image utilizing a plurality of convolutional layers (e.g., of a mapping network), and generating the style vectors from the intermediate latent vectors utilizing a plurality of learned transformations (e.g., learned affine transformations). Moreover, in some embodiments, the generative neural network includes generative convolutional blocks, and act 1502 includes generating the feature tensor utilizing a first subset of the generative convolutional blocks to generate the feature tensor from the first subset of the style vectors.

As shown in FIG. 15, the series of acts 1500 includes an act 1504 for mapping style vectors and the feature tensor to a joint feature style space. For example, the act 1504 can include mapping a second subset of the style vectors and the feature tensor to a joint feature style space or, in other words, combining the style vectors and the feature tensor to generate a joint feature style vector.

As shown in FIG. 15, the series of acts 1500 include an act 1506 of applying a perturbation within the joint feature style space. In some embodiments, for instance, act 1506 includes determining modified style vectors and a modified feature tensor by applying a joint feature style perturbation within the joint feature style space. In one or more embodiments, the act 1506 includes determining the joint feature style perturbation by utilizing a gradient descent optimization model to reduce a reconstruction error between the digital image and a reconstructed digital image (e.g., as described above in relation to FIG. 7). Further, in one or more embodiments, the act 1506 includes determining the joint feature style perturbation utilizing a neural network encoder comprising learned parameters tuned to predict joint feature style perturbations within the joint feature style space from digital images (e.g., as described above in relation to FIGS. 8-9). More specifically, in some embodiments, the act 1506 includes generating an initial joint feature style perturbation utilizing a learned encoder comprising learned parameters tuned to predict joint feature style perturbations within the joint feature style space, and determining the joint feature style perturbation utilizing a gradient descent optimization model to modify the initial joint feature style perturbation.

Further still, in some embodiments, the act 1506 includes determining the joint feature style perturbation utilizing a locality regularization term (e.g., as described above in relation to FIG. 10). Relatedly, in some embodiments, the act 1506 includes generating a first reconstructed digital image utilizing the generative neural network, generating a second reconstructed digital image utilizing the generative neural network by adding a reconstruction joint feature style perturbation within the joint feature style space, determining a locality regularization term by comparing the first reconstructed digital image and the second reconstructed digital image, and determining the joint feature style perturbation utilizing the locality regularization term.

As shown in FIG. 15, the series of acts 1500 includes an act 1508 of generating a modified digital image with the generative neural network. For example, in some embodiments, the act 1508 includes generating a modified digital image utilizing the generative neural network, the modified style vectors, and the modified feature tensor. Further, in some embodiments, act 1508 includes generating the modified digital image utilizing a second subset of the generative convolutional blocks of the generative neural network to generate the modified digital image from the modified style vectors and the modified feature tensor.

In addition (or in alternative) to the acts described above, the image projection system 106 can also perform an act of applying one or more user-requests modifications to a digital image. For example, some embodiments include an act for receiving user input of a digital image modification corresponding to the digital image, determining an image modification vector corresponding to the digital image modification in at least one of an intermediate latent space corresponding to the intermediate latent vectors or a latent style space corresponding to the style vectors, and mapping the image modification vector from the at least one of the intermediate latent space or the latent style space to the joint feature style space to generate a joint feature style modification vector. Moreover, in one or more embodiments, determining the modified style vectors and the modified feature tensor further includes applying the joint feature style perturbation and the joint feature style modification vector within the joint feature style space. Further still, in some embodiments, determining the modified style vectors and the modified feature tensor includes applying the joint feature style perturbation and the joint feature style modification vector to the joint feature style vector, and extracting the modified style vectors and the modified feature tensor from the joint feature style vector.

Furthermore, some embodiments of the image projection system 106 can also perform an act of generating, for a digital image, style vectors corresponding to a style space from intermediate latent vectors corresponding to an intermediate latent space, then, in response to user input indicating a digital image modification, determining a modification vector for at least one of the style space or the intermediate latent space. In some implementations, the image projection system can also perform an act of generating a modified digital image utilizing a generative neural network and the modified joint feature style vector. Additionally, one or more embodiments can include an act of extracting a modified feature tensor and a modified set of style vectors from the modified joint feature style vector, and generating the modified digital image utilizing the generative neural network from the modified feature tensor and the modified set of style vectors.

In addition (or in the alternative to) the acts described above, in some embodiments, the series of acts 1500 includes a step for generating a modified joint feature style vector from the style vectors and the modification vector. For example, the acts described in reference to FIGS. 2, 4 can comprise the corresponding acts (or structure) for performing a step for generating a modified joint feature style vector from the style vectors and the modification vector.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 16:
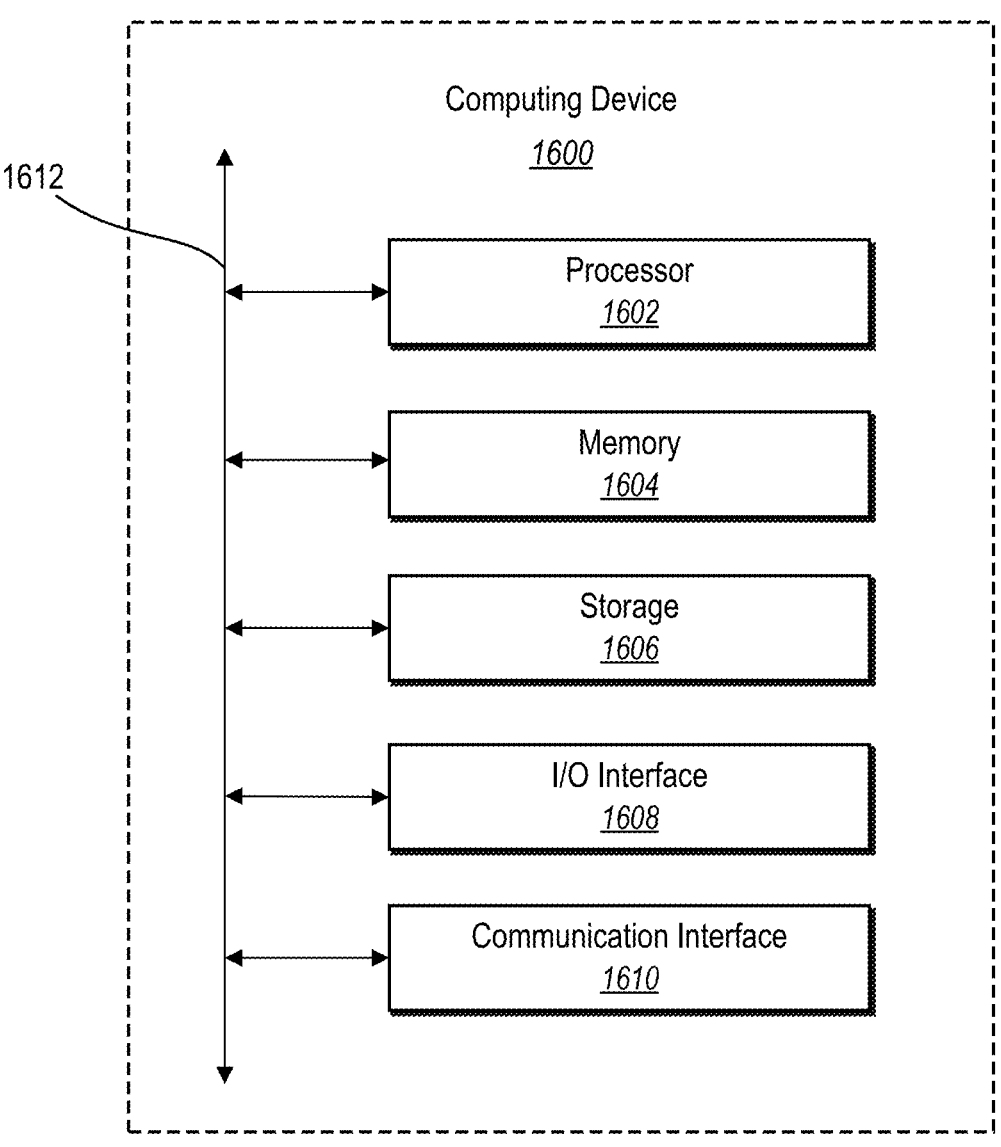
FIG. 16 illustrates a block diagram of an example computing device in accordance with one or more embodiments.

FIG. 16 illustrates a block diagram of an example computing device 1600 that may be configured to perform one or more of the processes described above. One will appreciate that one or more computing devices, such as the computing device 1600 may represent the computing devices described above (e.g., server device(s) 102, client devices 110, 600, and computing device(s) 1400). In one or more embodiments, the computing device 1600 may be a mobile device (e.g., a mobile telephone, a smartphone, a PDA, a tablet, a laptop, a camera, a tracker, a watch, a wearable device, etc.). In some embodiments, the computing device 1600 may be a non-mobile device (e.g., a desktop computer or another type of client device). Further, the computing device 1600 may be a server device that includes cloud-based processing and storage capabilities.

As shown in FIG. 16, the computing device 1600 can include one or more processor(s) 1602, memory 1604, a storage device 1606, input/output interfaces 1608 (or "I/O interfaces 1608"), and a communication interface 1610, which may be communicatively coupled by way of a communication infrastructure (e.g., bus 1612). While the computing device 1600 is shown in FIG. 16, the components illustrated in FIG. 16 are not intended to be limiting. Additional or alternative components may be used in other embodiments. Furthermore, in certain embodiments, the computing device 1600 includes fewer components than those shown in FIG. 16. Components of the computing device 1600 shown in FIG. 16 will now be described in additional detail.

In particular embodiments, the processor(s) 1602 includes hardware for executing instructions, such as those making up a computer program. As an example, and not by way of limitation, to execute instructions, the processor(s) 1602 may retrieve (or fetch) the instructions from an internal register, an internal cache, memory 1604, or a storage device 1606 and decode and execute them.

The computing device 1600 includes memory 1604, which is coupled to the processor(s) 1602. The memory 1604 may be used for storing data, metadata, and programs for execution by the processor(s). The memory 1604 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1604 may be internal or distributed memory.

The computing device 1600 includes a storage device 1606 includes storage for storing data or instructions. As an example, and not by way of limitation, the storage device 1606 can include a non-transitory storage medium described above. The storage device 1606 may include a hard disk drive (HDD), flash memory, a Universal Serial Bus (USB) drive or a combination these or other storage devices.

As shown, the computing device 1600 includes one or more I/O interfaces 1608, which are provided to allow a user to provide input to (such as user strokes), receive output from, and otherwise transfer data to and from the computing device 1600. These I/O interfaces 1608 may include a mouse, keypad or a keyboard, a touch screen, camera, optical scanner, network interface, modem, other known I/O devices or a combination of such I/O interfaces 1608. The touch screen may be activated with a stylus or a finger.

The I/O interfaces 1608 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1608 are configured to provide graphical data to a display for presentation to a user. The graphical data may be representative of one or more graphical user interfaces and/or any other graphical content as may serve a particular implementation.

The computing device 1600 can further include a communication interface 1610. The communication interface 1610 can include hardware, software, or both. The communication interface 1610 provides one or more interfaces for communication (such as, for example, packet-based communication) between the computing device and one or more other computing devices or one or more networks. As an example, and not by way of limitation, communication interface 1610 may include a network interface controller (NIC) or network adapter for communicating with an Ethernet or other wire-based network or a wireless NIC (WNIC) or wireless adapter for communicating with a wireless network, such as a WI-FI. The computing device 1600 can further include a bus 1612. The bus 1612 can include hardware, software, or both that connects components of computing device 1600 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions thereon that, when executed by at least one processor, cause a computing device to perform operations comprising:

generating style vectors representing a digital image;

generating a feature tensor from a first subset of the style vectors utilizing a series of generative convolutional blocks of a generative neural network;

mapping a second subset of the style vectors and the feature tensor to a joint feature style space by combining the second subset of the style vectors with the feature tensor to generate a joint feature style vector, the second subset of the style vectors including one or more style vectors not utilized in generating the feature tensor;

determining a modified joint feature style vector by combining a joint feature style perturbation with the joint feature style vector within the joint feature style space;

extracting modified style vectors and a modified feature tensor from the modified joint feature style vector; and generating a modified digital image, utilizing the generative neural network, from the modified style vectors and the modified feature tensor.

2. The non-transitory computer-readable medium of claim 1, further comprising instructions that, when executed by the at least one processor, cause the computing device to perform operations comprising:

generating intermediate latent vectors from the digital image utilizing a plurality of convolutional layers to map an initial latent code corresponding to the digital image to an intermediate latent space; and generating the style vectors from the intermediate latent vectors utilizing a plurality of learned affine transformations to embed the intermediate latent vectors within a latent style space.

3. The non-transitory computer-readable medium of claim 2, further comprising instructions that, when executed by the at least one processor, cause the computing device to perform operations comprising:

receiving user input of a digital image modification corresponding to the digital image;

determining an image modification vector corresponding to the digital image modification in at least one of the intermediate latent space corresponding to the intermediate latent vectors or the latent style space corresponding to the style vectors; and mapping, utilizing the series of generative convolutional blocks of the generative neural network, the image modification vector from the at least one of the intermediate latent space or the latent style space to the joint feature style space to generate a joint feature style modification vector.

4. The non-transitory computer-readable medium of claim 3, wherein determining the modified joint feature style vector further comprises combining the joint feature style perturbation and the joint feature style modification vector with the joint feature style vector within the joint feature style space.

5. The non-transitory computer-readable medium of claim 4, wherein determining the modified style vectors and the modified feature tensor further comprises:

combining the joint feature style perturbation and the joint feature style modification vector with the joint feature style vector within the joint feature style space to generate the modified joint feature style vector; and extracting the modified style vectors and the modified feature tensor from the modified joint feature style vector.

6. The non-transitory computer-readable medium of claim 1, wherein:

the series of generative convolutional blocks of the generative neural network comprises a first subset of generative convolutional blocks and a second subset of generative convolutional blocks, and generating the feature tensor comprises utilizing the first subset of generative convolutional blocks to generate the feature tensor from the first subset of the style vectors.

7. The non-transitory computer-readable medium of claim 6, wherein generating the modified digital image comprises utilizing the second subset of generative convolutional blocks of the generative neural network to generate the modified digital image from the modified style vectors and the modified feature tensor.

8. The non-transitory computer-readable medium of claim 1, further comprising instructions that, when executed by the at least one processor, cause the computing device to perform operations comprising determining the joint feature style perturbation by utilizing a gradient descent optimization model to reduce a reconstruction error between the digital image and a reconstructed digital image.

9. The non-transitory computer-readable medium of claim 1, further comprising instructions that, when executed by the at least one processor, cause the computing device to perform operations comprising determining the joint feature style perturbation utilizing a neural network encoder comprising learned parameters tuned to predict joint feature style perturbations within the joint feature style space from digital images.

10. The non-transitory computer-readable medium of claim 1, further comprising instructions that, when executed by the at least one processor, cause the computing device to perform operations comprising determining the joint feature style perturbation utilizing a locality regularization term.

11. A system comprising:

at least one storage device comprising: a digital image, an encoder comprising learned transformations, and a generative neural network comprising generative convolutional blocks; and at least one processor configured to cause the system to:

generate style vectors for a first digital image from intermediate latent vectors utilizing the learned transformations of the encoder;

determine a feature tensor from a first subset of the style vectors utilizing the generative convolutional blocks of the generative neural network;

determine a joint feature style vector within a joint feature style space by combining a second subset of the style vectors and the feature tensor, the second subset of the style vectors including one or more style vectors not utilized in generating the feature tensor;

generate a modified joint feature style vector by combining a joint feature style perturbation with the joint feature style vector within the joint feature style space; and generate a second digital image, utilizing the generative neural network, from the modified joint feature style vector.

12. The system of claim 11, wherein the at least one processor is further configured to cause the system to determine the feature tensor from the first subset of the style vectors utilizing a first subset of the generative convolutional blocks.

13. The system of claim 12, wherein the at least one processor is further configured to cause the system to generate the second digital image from the modified joint feature style vector utilizing a second subset of the generative convolutional blocks, the second subset of the generative convolutional blocks including one or more generative convolutional blocks not utilized in generating the feature tensor from the first subset of the style vectors.

14. The system of claim 11, wherein the at least one processor is further configured to modify the second digital image by:

mapping one or more image modification vectors from an intermediate latent space corresponding to the intermediate latent vectors to a style space corresponding to the style vectors utilizing the learned transformations of the encoder;

mapping, utilizing the generative convolutional blocks of the generative neural network, the one or more image modification vectors from the style space to the joint feature style space to generate one or more joint feature style modification vectors; and combining the one or more joint feature style modification vectors and the joint feature style perturbation with the joint feature style vector within the joint feature style space to generate the modified joint feature style vector.

15. The system of claim 11, wherein the at least one processor is further configured to modify the second digital image by:

mapping, utilizing the generative convolutional blocks of the generative neural network, one or more image modification vectors from a style space to the joint feature style space to generate one or more joint feature style modification vectors; and combining the one or more joint feature style modification vectors and the joint feature style perturbation with the joint feature style vector within the joint feature style space to generate the modified joint feature style vector.

16. The system of claim 11, wherein the at least one processor is further configured to determine the joint feature style perturbation by utilizing gradient descent optimization to reduce a reconstruction error.

17. The system of claim 11, wherein the at least one processor is further configured to determine the joint feature style perturbation by:

generating an initial joint feature style perturbation utilizing a learned encoder comprising learned parameters tuned to predict joint feature style perturbations within the joint feature style space; and determining the joint feature style perturbation utilizing a gradient descent optimization model to modify the initial joint feature style perturbation to reduce a reconstruction error.

18. The system of claim 11, wherein the at least one processor is further configured to determine the joint feature style perturbation by:

generating a first reconstructed digital image utilizing the generative neural network;

generating a second reconstructed digital image utilizing the generative neural network by adding a reconstruction joint feature style perturbation within the joint feature style space;

determining a locality regularization term by comparing the first reconstructed digital image and the second reconstructed digital image; and determining the joint feature style perturbation utilizing the locality regularization term.

19. A computer-implemented method comprising:

generating, for a digital image, style vectors corresponding to a style space from intermediate latent vectors corresponding to an intermediate latent space;

generating a joint feature style vector corresponding to a joint feature style space by:

generating a feature tensor by passing a subset of the style vectors through a series of generative convolutional blocks of a generative neural network; and combining the feature tensor with a second subset of the style vectors;

in response to user input indicating a digital image modification, determining a modification vector for at least one of the style space or the intermediate latent space;

mapping the modification vector to the joint feature style space utilizing the series of generative convolutional blocks;

generating, within the joint feature style space, a modified joint feature style vector by combining the joint feature style vector with the modification vector; and generating a modified digital image utilizing the generative neural network and the modified joint feature style vector.

20. The computer-implemented method of claim 19, further comprising generating the modified digital image utilizing the generative neural network by:

extracting a modified feature tensor and a modified set of style vectors from the modified joint feature style vector, and generating the modified digital image by passing the modified feature tensor and the modified set of style vectors through a subsequent series of generative convolutional blocks of the generative neural network.

* * * * *